United States Patent
Shin et al.

(10) Patent No.: US 12,148,430 B2
(45) Date of Patent: Nov. 19, 2024

(54) METHOD, SYSTEM, AND COMPUTER-READABLE RECORDING MEDIUM FOR MANAGING TEXT TRANSCRIPT AND MEMO FOR AUDIO FILE

(71) Applicants: NAVER CORPORATION, Seongnam-si (KR); LINE WORKS CORP., Tokyo (JP)

(72) Inventors: Jieun Shin, Seongnam-si (KR); Gil Hwan Hwang, Seongnam-si (KR); Ye Lim Jeong, Seongnam-si (KR); Dai-Hyun Lim, Seongnam-si (KR); SuMee Lee, Seongnam-si (KR); Hyangnam Oh, Seongnam-si (KR); Junghoon Jang, Seongnam-si (KR); Namkyu Jung, Seongnam-si (KR); Geonmin Kim, Seongnam-si (KR); Deok Su Kim, Seongnam-si (KR); Hyunjin Kim, Seongnam-si (KR); Daigeun Sohn, Seongnam-si (KR); Yeon Soo Song, Seongnam-si (KR); Dongyeol Lee, Seongnam-si (KR); Jin-myoung Lee, Seongnam-si (KR); Yujin Jeon, Seongnam-si (KR); Jongmin Choi, Seongnam-si (KR)

(73) Assignees: NAVER CORPORATION, Seongnam-si (KR); LINE WORKS CORP, Tokyo (JP)

( * ) Notice: Subject to any disclaimer, the term of this patent is extended or adjusted under 35 U.S.C. 154(b) by 436 days.

(21) Appl. No.: 17/448,616

(22) Filed: Sep. 23, 2021

(65) Prior Publication Data
US 2022/0093103 A1 Mar. 24, 2022

(30) Foreign Application Priority Data

Sep. 23, 2020 (KR) ........................ 10-2020-0122847
Sep. 29, 2020 (KR) ........................ 10-2020-0127519
(Continued)

(51) Int. Cl.
*G10L 15/26* (2006.01)
*G06F 40/106* (2020.01)
*G10L 15/08* (2006.01)

(52) U.S. Cl.
CPC ............ *G10L 15/26* (2013.01); *G06F 40/106* (2020.01); *G10L 15/08* (2013.01)

(58) Field of Classification Search
CPC ...... G06F 40/106; G06F 40/284; G06F 40/30; G10L 15/08; G10L 15/26; G10L 15/22;
(Continued)

(56) References Cited

U.S. PATENT DOCUMENTS

| 11,853,701 B2* | 12/2023 | Brinig ..................... G06F 40/30 |
| 2007/0041522 A1* | 2/2007 | Abella ................ H04M 3/5307 379/88.14 |

(Continued)

FOREIGN PATENT DOCUMENTS

| CN | 109166584 A | * | 1/2019 |
| JP | 2006178087 A | | 7/2006 |

(Continued)

OTHER PUBLICATIONS

Office Action issued in corresponding to Korean patent application No. 10-2020-0122847, dated Oct. 26, 2021.
(Continued)

*Primary Examiner* — Md S Elahee
(74) *Attorney, Agent, or Firm* — Greer Burns & Crain Ltd.

(57) ABSTRACT

An audio recording management method includes creating a text transcript of an audio recording by converting speech to
(Continued)

text, matching and managing the text transcript and a memo written during recording or playback of the audio, and providing the text transcript in connection with the memo.

17 Claims, 25 Drawing Sheets

(30) Foreign Application Priority Data

Oct. 15, 2020 (KR) .......................... 10-2020-0133224
Oct. 22, 2020 (KR) .......................... 10-2020-0137324

(58) Field of Classification Search
CPC ........ G10L 2015/221; G10L 2015/088; H04M 3/5307
USPC .......................................................... 704/235
See application file for complete search history.

(56) References Cited

U.S. PATENT DOCUMENTS

| | | | | |
|---|---|---|---|---|
| 2013/0054229 | A1* | 2/2013 | Jeon | H04M 1/656 704/201 |
| 2013/0254175 | A1 | 9/2013 | Zhang et al. | |
| 2022/0059096 | A1* | 2/2022 | Ackerman | G06V 40/172 |

FOREIGN PATENT DOCUMENTS

| | | | |
|---|---|---|---|
| JP | 2007226091 | A | 9/2007 |
| JP | 2008139969 | A | 6/2008 |
| JP | 2010175765 | A | 8/2010 |
| JP | 2010238050 | A | 10/2010 |
| JP | 2011257878 | A | 12/2011 |
| JP | 2013077193 | A | 4/2013 |
| JP | 2014222290 | A * | 11/2014 |
| JP | 201897239 | A | 6/2018 |
| JP | 2019105751 | A | 6/2019 |
| JP | 2020086412 | A | 6/2020 |
| JP | 2020154847 | A | 9/2020 |
| KR | 1020130024255 | A | 3/2013 |
| KR | 1020130111187 | A | 10/2013 |
| KR | 1020140062217 | A | 5/2014 |
| KR | 1020150024188 | A | 3/2015 |
| KR | 1020200030354 | A | 3/2020 |
| WO | 2016163028 | A1 | 10/2016 |

OTHER PUBLICATIONS

Office Action issued in corresponding Korean Patent Application No. 10-2020-0127519, dated Feb. 22, 2022.
Office Action issued in corresponding Korean patent application No. 10-2023-0022748, dated Mar. 21, 2023.
Office Action issued in corresponding to Korean patent application No. 10-2020-0133224, dated Nov. 25, 2021.
Office Action issued in corresponding to Korean patent application No. 10-2020-0137324, dated Nov. 29, 2021.
Office Action issued in corresponding Japanese patent application No. 2021-14195, dated Mar. 15, 2022.
Office Action issued in corresponding Japanese patent application No. 2021-21395, dated Apr. 5, 2022.
Office Action issued in corresponding Japanese patent application No. 2021-21396, dated on Apr. 5, 2022.
Office Action issued in corresponding Japanese patent application No. 2021-018726, dated Apr. 12, 2022.
Mitsuhiro Okada, Shin-Speed Smartphone Work Technology, 1st Edition, Japan, Subaru-sha Co., Ltd., Aug. 17, 2019, pp. 88-89.
Cellco Joe, SQL 4th Edition for Programmers, 1st Edition, Japan, Shoyoung Co., Ltd., Jul. 5, 2013, pp. 249-256.
Yuki Yamada's iPhone 10th Anniversary Project Part 2 2016-2017 carefully selected iPhone apps! You can use it! The new standard app is full of great works that color your iPhone life, Mac Fan, Japan, Mynavi Publishing Co., Ltd., Nov. 1, 2017, vol. 25, vol. 11, vol. 417, p. 133.

* cited by examiner

- ⊕ Make a new note
- ⌂ Home
- ▱ All notes 65

My folder
- ▭ Folder 1
- ▭ Folder 2
- ▭ Folder 3
- ▭ Folder 4
- 🗑 Trash box
- ⚙ Settings Title
2020.04.01 P.M. 5:01
Participants: user1, user2, user3    [Add a participant >]

Audio recordings    [▯▯▯] View audio recordings only

- ⓡ Speaker 1 00:02
  Hi, Is everybody here? Ok, let's get started
  First off, I've sent you guys a draft of the plan earlier by email    [Memo]—1441
- ⓡ Speaker 2 00:45
  I have something to ask.
  Can you please share the demo site
  we discussed last month?    [Memo]
- ⓡ Speaker 1 01:07
  Sure, I'll give you a link.
- ⓡ Speaker 3: 01:30
  How is language support going? Are you planning to support other languages?
- ⓡ Speaker 1 01:57
  We're going to only support the Korean language for now.
  We're working on Japanese.    [Memo]

⟲15  ▷  ↻15

00:00 ─────────────────── 51:30    —1060

1040

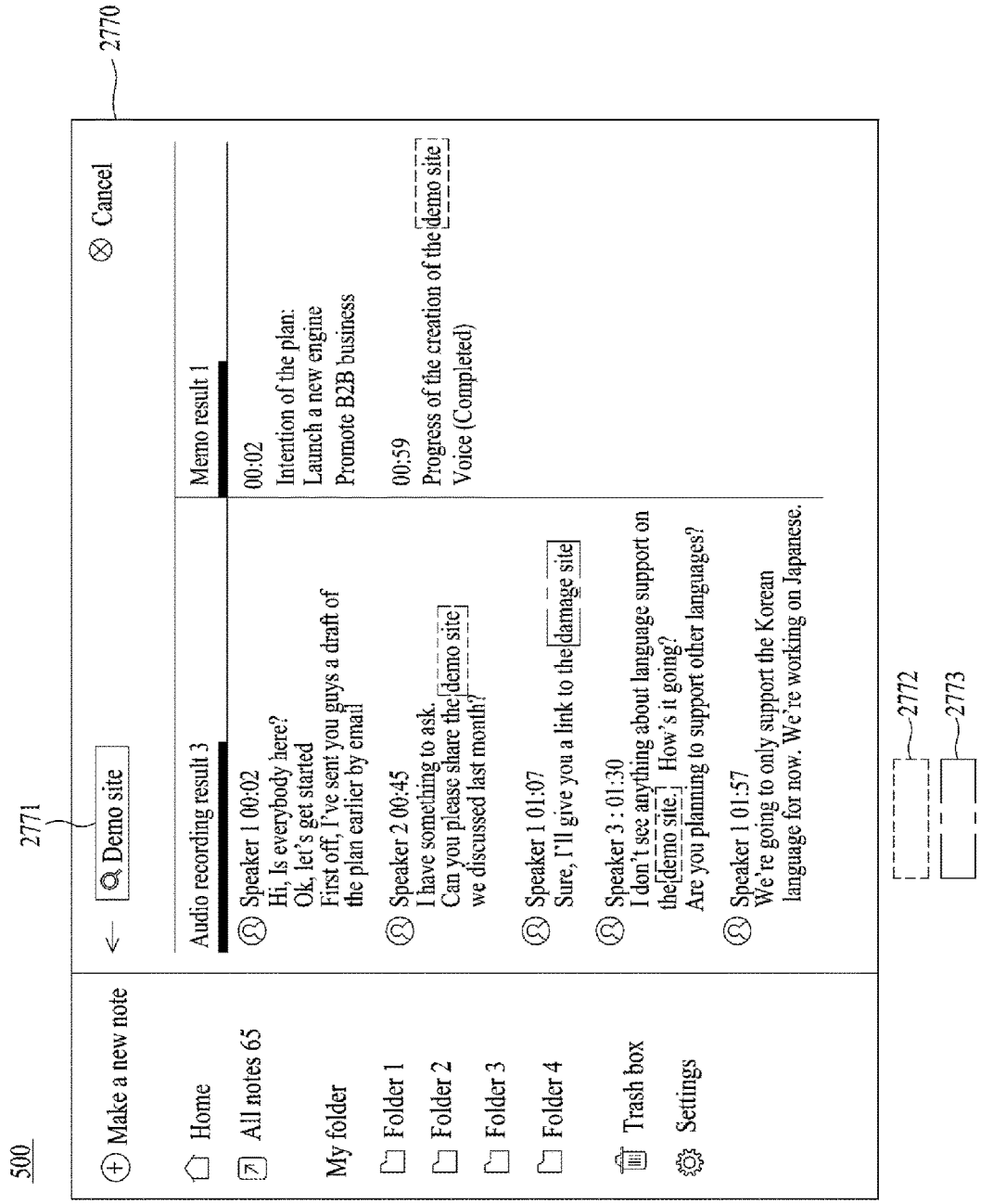

METHOD, SYSTEM, AND COMPUTER-READABLE RECORDING MEDIUM FOR MANAGING TEXT TRANSCRIPT AND MEMO FOR AUDIO FILE

CROSS-REFERENCE TO RELATED APPLICATIONS

This application is based on and claims priority under 35 U.S.C. 119 to Korean Patent Application No. 10-2020-0122847, filed Sep. 23, 2020, Korean Patent Application No. 10-2020-0127519, filed Sep. 29, 2020, Korean Patent Application No. 10-2020-0133224, filed Oct. 15, 2020, and Korean Patent Application No. 10-2020-0137324, filed Oct. 22, 2020, in the Korean intellectual property office, the disclosures of which are incorporated herein by reference in their entirety.

BACKGROUND OF THE INVENTION

Field of Invention

The following description relates to technology for managing a text transcript of an audio recording of speech.

Description of Related Art

In general, mobile speech transcription is a technology that records audio on a mobile device and converts speech in the recorded segment into text and shows the text on a display once the recording of the audio is completed.

As an example, Korean Laid-Open Patent Publication No. 10-2014-0062217 (published on May 23, 2014) discloses a technology for recording audio and converting it to text.

BRIEF SUMMARY OF THE INVENTION

This summary is provided to introduce a selection of concepts in a simplified form that are further described below in the Detailed Description.

The present disclosure provides a method and a system for matching and managing a text transcript of a recorded speech and a memo written in relation to the recorded speech.

The present disclosure provides a method and a system for showing an audio recording and a memo in a dual view.

The present disclosure provides a method and a system for providing audio recordings and memos by grouping them according to various filtering criteria.

The present disclosure provides a method and a system for automatically managing an audio recording by connecting to an artificial intelligent device that provides an audio-based interface.

The present disclosure provides a method and a system for improving speech recognition by using words entered by the user during recording of conversational speech in relation to the context of the conversation.

The present disclosure provides a method and a system for looking up words with a similar pronunciation in a text transcript of an audio recording of speech.

An exemplary embodiment of the present disclosure provides an audio recording management method executed by a computer device, the computer device including at least one processor configured to execute computer-readable instructions contained in a memory, the method including the steps of: creating a text transcript of an audio recording by converting speech to text, by the at least one processor; matching and managing the audio recording and a memo written during recording or playback of the audio, by the at least one processor; and providing the audio recording in connection with the memo, by the at least one processor.

According to one aspect, the providing of the text transcript may include displaying the text transcript of the audio recording and the memo together in a dual view.

According to another aspect, the providing of the text transcript may include matching and displaying the text transcript of the audio recording and the memo in terms of time based on a timestamp.

According to a further aspect, the providing of the text transcript may include displaying a timestamp for the text of a speaker's utterance in the audio recording to indicate when the utterance occurs; and displaying a timestamp for the memo to indicate an audio recording time or audio playback time at the time of creation of the memo.

According to a further aspect, the providing of the text transcript may include displaying a memo tag for the text of a speaker's utterance included in the audio recording depending on whether there is a memo written in the utterance; and displaying the full memo written in the utterance of the text when the memo tag is selected.

According to a further aspect, the creating of the text transcript may include receiving an audio file recorded from a client or an audio file uploaded from the client and converting speech data corresponding to a speaker's utterance into text.

According to a further aspect, the managing of the text transcript may include matching and managing a memo written during recording or playback of the audio based on a timestamp of the audio recording.

According to a further aspect, the managing of the text transcript may include matching and managing a memo written in a speaker's utterance in the audio and an audio recording of the speaker's utterance.

According to a further aspect, the creating of the text transcript may include connecting an artificial intelligent device providing an audio-based interface to a user account; and creating the text transcript by converting a speech received from the artificial intelligent device into text.

According to a further aspect, the connecting of the artificial intelligent device may include issuing a connect key in response to a request from the artificial intelligent device; and connecting the user account and the artificial intelligent device upon receiving the connect key through the user account.

According to a further aspect, the providing of the text transcript may include sharing the text transcript of the audio recording with at least one user specified through the user account.

According to a further aspect, the creating of the text transcript may include performing speech recognition by assigning a weight to a custom keyword the user enters in relation to the speech.

According to a further aspect, the performing of the speech recognition may include performing the speech recognition by applying boosting to the custom keyword.

According to a further aspect, the performing of the speech recognition may include extracting the custom keyword from the memo.

According to a further aspect, the performing of the speech recognition may include extracting, as the custom keyword, at least either a word entered by the user to give information on the text transcript of the audio recording or a keyword registered as a frequently used word.

According to a further aspect, the audio recording management method may further include looking up a word with a similar pronunciation to a search word in the audio recording, by the at least one processor.

According to a further aspect, the audio recording management method may further include looking up a word whose similarity to the search word is a certain percent or more by comparing words depending on the types of smaller units the words are broken down into.

According to a further aspect, the audio recording management method may further include correcting at least one word contained in a search result for the text transcript of the audio recording and replacing the same with another word, by the at least one processor.

Another exemplary embodiment of the present disclosure provides a computer-readable recording medium with a program stored therein to execute the audio recording management method on a computer.

Yet another exemplary embodiment of the present disclosure provides a computer device including at least one processor configured to execute computer-readable instructions contained in a memory, the at least one processor including: a text transcript creation part for creating a text transcript of an audio recording by converting speech to text; a memo matching and management part for matching and managing the text transcript and a memo written during recording or playback of the audio; and a text transcript provision part for providing the text transcript of the audio recording in connection with the memo.

According to the embodiments of the present disclosure, a text transcript of a recorded speech and a memo written in relation to the recorded speech are matched and shown in a dual view, thereby making search for the text transcript of the audio recordings and memos more convenient.

According to the embodiments of the present disclosure, a filtering function for grouping the text transcript of the audio recordings and memos by speakers or keywords may be provided, thereby enhancing the user's convenience.

According to the embodiments of the present disclosure, an artificial intelligent device may be connected to an audio recording management service to automatically record live audio in text using a speech recognition technique, thereby expanding the use of the service and enhancing the user's convenience.

According to the embodiments of the present disclosure, boosting may be applied to words entered by the user during recording of conversational speech in relation to the context of the conversation, allowing for more accurate recognition of the words in the process of converting recorded speech into text.

According to the embodiments of the present disclosure, when looking up words in a text transcript of an audio recording of speech, words with a similar pronunciation may be searched as well, thereby improving the performance of a word search in the audio recording.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 5 to 15 illustrate an example of a user interface screen for audio recording management in an embodiment of the present disclosure.

FIGS. 26 and 27 illustrate an example of a user interface screen for an audio recording search function in an embodiment of the present disclosure.

DETAILED DESCRIPTION OF THE INVENTION

Hereinafter, an embodiment of the present disclosure will be described in detail with reference to the accompanying drawings.

An audio recording management system according to embodiments of the present disclosure may be implemented by at least one computer device. An audio recording management method according to embodiments of the present disclosure may be performed by at least one computer device included in the audio recording management system. A computer program according to an embodiment of the disclosure may be installed and run on the computer device. The computer device may perform an audio recording management method according to embodiments of the present disclosure the under control of a running computer program. The above computer program may be coupled to the computer device and stored in a computer-readable recording medium in order to execute the audio recording management method on the computer device.

Figure 1:
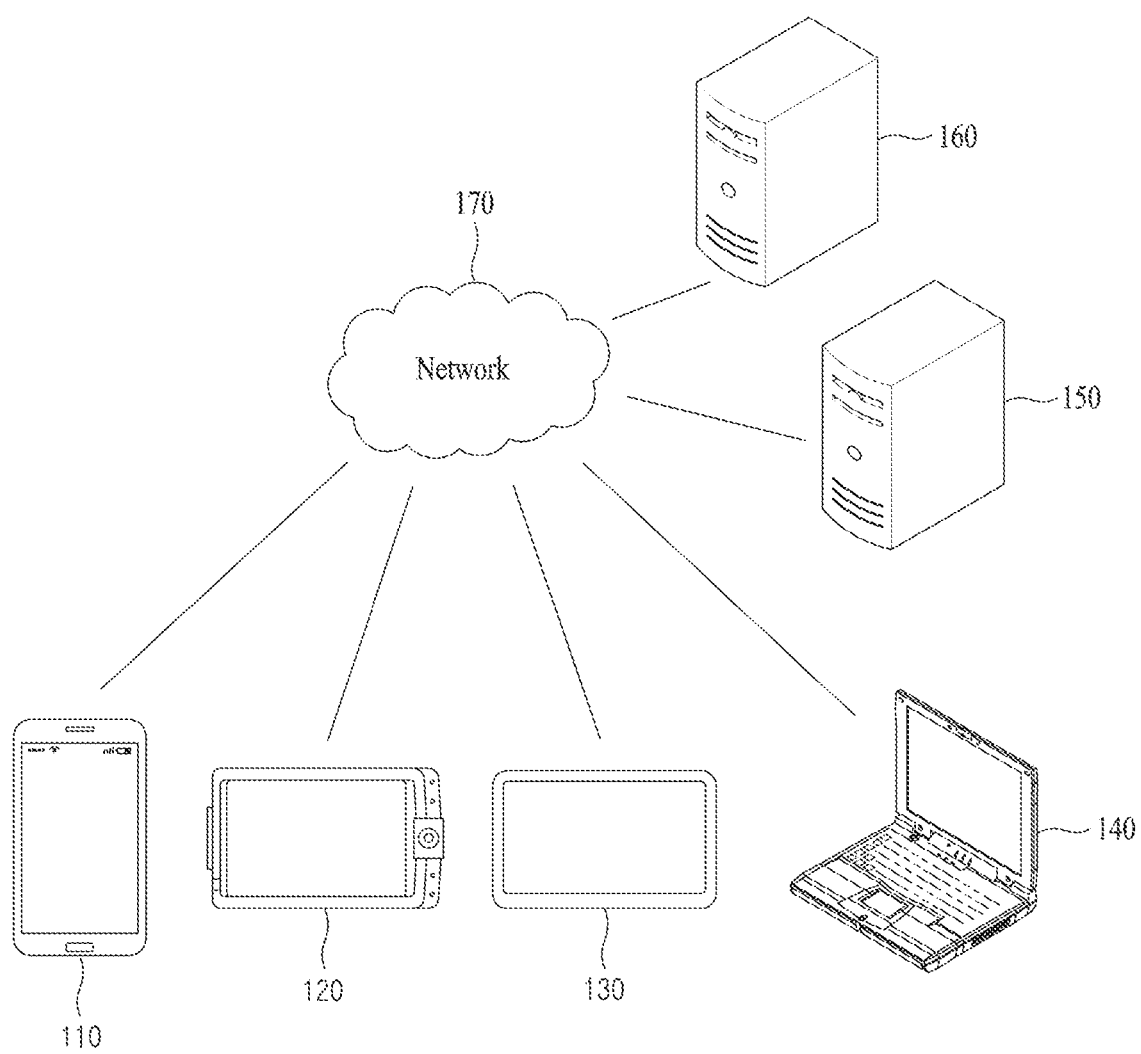
FIG. 1 is a diagram illustrating an example of a network environment according to an embodiment of the present disclosure.

FIG. 1 is a diagram illustrating an example of a network environment according to an embodiment of the present disclosure. The network environment of FIG. 1 shows an example in which the network environment includes a plurality of electronic devices 110, 120, 130, and 140, a plurality of servers 150 and 160, and a network 170. FIG. 1 is only an example for describing the present disclosure, and the number of electronic devices or the number of servers is not limited to what is shown in FIG. 1. Also, the network environment of FIG. 1 is only an example of environments applicable to embodiments of the present disclosure, and the environments applicable to embodiments of the present disclosure are not limited to the network environment of FIG. 1.

The plurality of electronic devices 110, 120, 130, 140 may be stationary terminals or mobile terminals that are implemented by a computer device. Examples of the plurality of electronic devices 110, 120, 130, 140 may include a smart phone, a cellular phone, a navigation device, a computer, a laptop, a digital broadcasting terminal, a personal digital assistant (PDA), a portable multimedia player (PMP), a tablet PC, etc. Although FIG. 1 shows an image of a smartphone as an example of the electronic device 110, the electronic device 110 in the embodiments of the present disclosure may refer to one of various physical computer systems capable of substantially communicating with the other electronic devices 120, 130, and 140, and/or the servers 150 and 160 over the network 170, by using a wireless or wired communication method.

The method of communication is not particularly limited, and may include a communication method using near field communication between devices as well as a communication method using a communication network (e.g., a mobile communication network, wired Internet, wireless Internet, and a broadcasting network) which the network 170 may include. For example, the network 170 may include one or more networks, including a personal area network (PAN), a local area network (LAN), a campus area network (CAN), a metropolitan area network (MAN), a wide area network (WAN), a broadband network (BBN), and the Internet. Also, the network 170 may include, but not limited to, one or more network topologies, including a bus network, a star network, a ring network, a mesh network, a star-bus network, a tree or hierarchical network, and the like.

Each of the servers 150 and 160 may be configured as a computer device or a plurality of computer devices that provide instructions, code, files, content, services, and the like through communication with the plurality of electronic devices 110, 120, 130, and 140 over the network 170. For example, the server 150 may be a system that provides service (e.g., an audio recording management service (or a meeting minute recording service), a content provision service, a group call service (or a voice conference service), a messaging service, a mail service, a social networking service, a map service, a translation service, a financial service, a payment service, and a search service).

Figure 2:
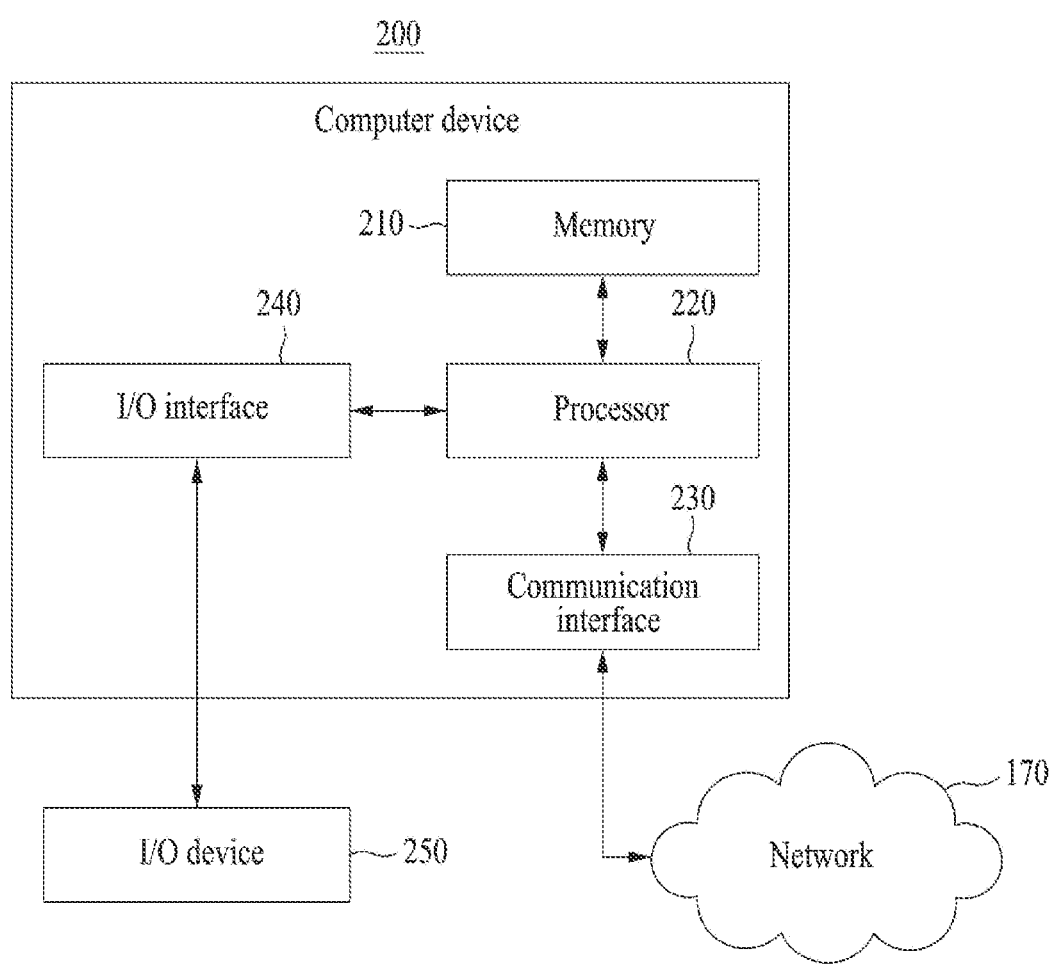
FIG. 2 is a block diagram illustrating an example of a computer device according to an embodiment of the present disclosure.

FIG. 2 is a block diagram illustrating an example of a computer device according to an embodiment of the present disclosure. Each of the plurality of electronic devices 110, 120, 130 and 140 or each of the servers 150 and 160 may be implemented by a computer device 200 illustrated in FIG. 2.

As illustrated in FIG. 2, the computer device 200 may include a memory 210, a processor 220, a communication interface 230, and an input/output (I/O) interface 240. The memory 210 is a computer-readable recording medium, and may include a permanent mass storage device, such as random access memory (RAM), read only memory (ROM), or a disk drive. In this case, the permanent mass storage device, such as ROM and a disk drive, may be included in the computer device 200 as a permanent storage device separate from the memory 210. Furthermore, an operating system and at least one program code may be stored in the memory 210. Such software elements may be loaded from a computer-readable recording medium, separate from the memory 210, to the memory 210. Such a separate computer-readable recording medium may include computer-readable recording media, such as a floppy drive, a disk, a tape, a DVD/CD-ROM drive, and a memory card. In another embodiment, software elements may be loaded onto the memory 210, not through a computer-readable recording medium but through the communication interface 230. For example, the software elements may be loaded onto the memory 210 of the computer device 200 based on a computer program installed by files received over the network 170.

The processor 220 may be configured to process instructions of a computer program by performing basic arithmetic operations, logic operations, and I/O operations. The instructions may be provided to the processor 220 by the memory 210 or the communication interface 230. For example, the processor 220 may be configured to execute received instructions based on a program code stored in a storage device, such as the memory 210.

The communication interface 230 may provide a function for enabling the computer device 200 to communicate with other devices (e.g., the aforementioned storage devices) over the network 170. For example, a request, an instruction, data or a file generated by the processor 220 of the computer device 200 based on a program code stored in a storage device, such as the memory 210, may be provided to other devices over the network 170 under the control of the communication interface 230. Inversely, a signal, an instruction, data or a file from another device may be received by the computer device 200 through the communication interface 230 of the computer device 200 over the network 170. The signal, instruction or data received through the communication interface 230 may be transmitted to the processor 220 or the memory 210. The file received through the communication interface 230 may be saved in a storage medium (i.e., the aforementioned permanent storage device) which may be further included in the computer device 200.

The input/output interface 240 may be a means for connecting to an input/output device 250. For example, the input device of the input/output device 250 may include devices, such as a microphone, a keyboard, or a mouse, and the output device of the input/output device 250 may include devices, such as a display or a speaker. For another example, the input/output interface 240 may be a means for connecting to a device whose functions for input and output are integrated into one, such as a touchscreen. The input/output device 250, together with the computer device 200, may be configured as a single device.

Furthermore, in other embodiments, the computer device 200 may include fewer or more elements than those in FIG. 2. For example, the computer device 200 may be implemented to include at least part of the input/output device 250 or may further include other elements, such as a transceiver and a database.

Hereinafter, a concrete embodiment of a method and a system for providing a recording and memo for an audio file together will be described.

As recent mobile devices provide an audio recording feature and a memo feature, it has become common for many people to record at conferences, meetings, and other various situations. In this case, other important information or attachments are added as memos, i.e., notes or comments, apart from the recording.

Conventionally, the audio recording feature and the memo feature have been provided as separate features, which makes it difficult to check an audio recording file and a memo together at the same time. Thus, the user can only guess the content of the recording by viewing the memo. In other words, the user needs to check the audio and the memo separately, so that it is difficult to check the memo while grasping the whole context of the recorded content.

To solve this problem, the present embodiment provides an audio recording management service in which a text transcript of a recorded speech and a memo written in relation to the recorded speech are matched and managed.

The present embodiments allow for matching and managing together the text transcript of an audio recording and a memo by integrating an audio recording feature, including audio recording and speech-to-text conversion, and a memo feature.

Figure 3:
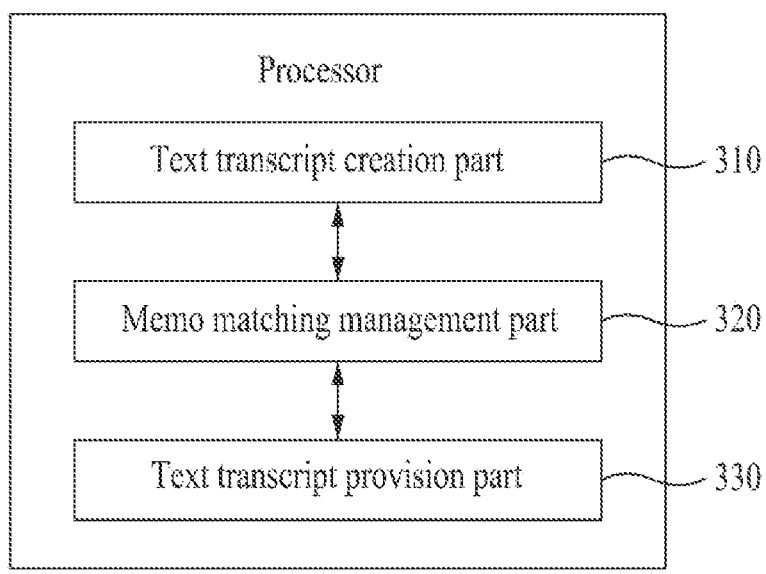
FIG. 3 is a block diagram illustrating an example of components that may be included in a processor of the computer device according to an embodiment of the present disclosure.
Figure 4:
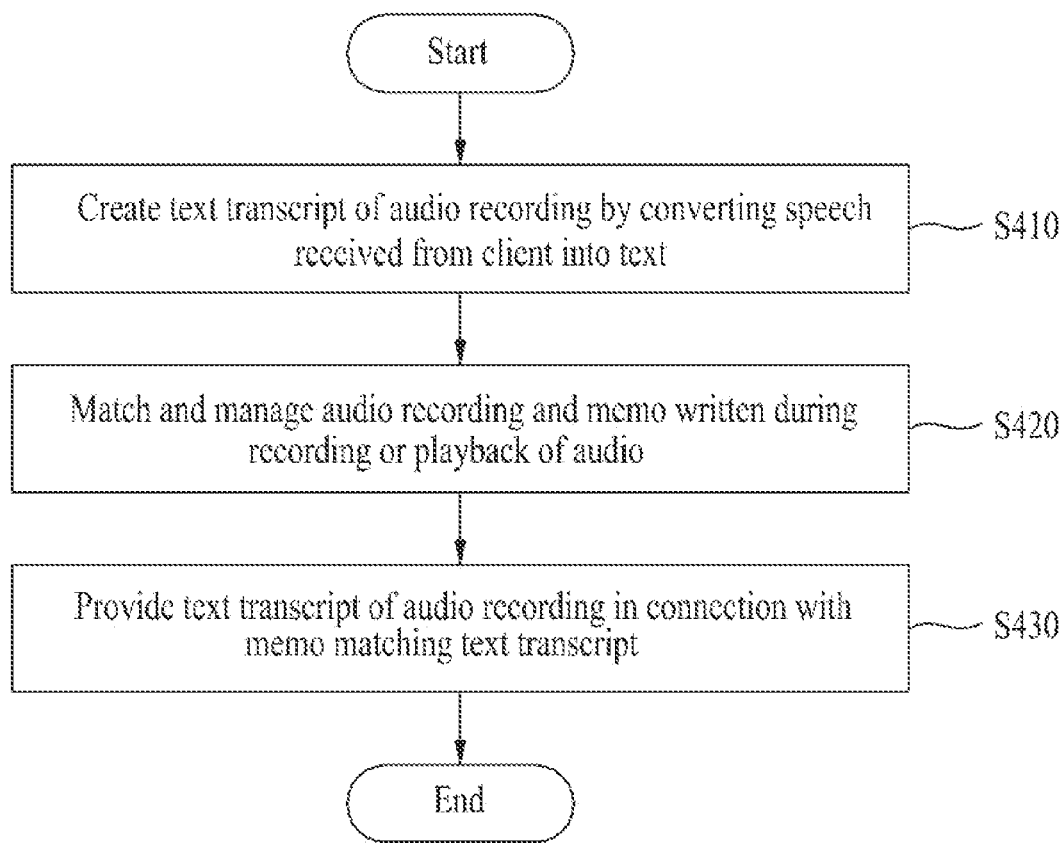
FIG. 4 is a flowchart illustrating an example of a method that may be performed by a computer device according to an embodiment of the present disclosure.

FIG. 3 is a block diagram illustrating an example of components that may be included in the processor 220 of the computer device 200 according to an embodiment of the present disclosure. FIG. 4 is a flowchart illustrating an example of a method that may be performed by the computer device 200 according to an embodiment of the present disclosure.

The computer device 200 according to the present embodiment may provide a client with an audio recording management service through access to a dedicated application installed on the client or a web/mobile site related to the computer device 200. A computer-implementable audio recording management system may be configured in the computer device 200.

The processor 220 of the computer device 200 is a component for performing the audio recording management method of FIG. 4 and, as illustrated in FIG. 3, may include a text transcript creation part 310, a memo matching and management part 320, and a text transcript provision part 330. In some embodiments, the components of the processor 220 may be selectively included in or excluded from the processor 220. Also, in some embodiments, the components of the processor 220 may be separated or merged for representation of functions of the processor 220.

The processor 220 and the components of the processor 220 may control the computer device 200 to perform steps S410 to S430 of the audio recording management method shown in FIG. 3. For example, the processor 220 and the components of the processor 220 may be configured to execute instructions according to code of an operating system included in the memory 210 and code of at least one program.

The components of the processor 220 may be representations of different functions performed by the processor 220 in response to an instruction provided by the program code stored in the computer device 200. For example, the text transcript creation part 310 may be used as a functional representation of the processor 220 that controls the computer device 200 in response to the above instruction such that the computer device 200 may create a text transcript of an audio recording.

The processor 220 may read a required instruction from the memory 210 where instructions related to the control of the computer device 200 are loaded. In this case, the read instruction may include an instruction for controlling the processor 220 to perform steps S410 to S430 to be explained later.

Steps S410 to S430 to be explained later may be performed in an order different from that shown in FIG. 4, and some of steps S410 to S430 may be omitted or additional steps may be further included.

Referring to FIG. 4, in step S410, the text transcript creation part 310 may create a text transcript of an audio recording by converting speech received from a client into text. The client's device may send an audio file being recorded by executing the recording feature or an audio file saved on the device. The text transcript creation part 310 may create a text transcript of speech data corresponding to a speaker's utterance, by using a well-known speech recognition technology. In this case, the text transcript creation part 310 may employ a speaker separation technology that separates each speaker's utterances in the process of creating a text transcript of an audio recording. The text transcript creation part 310 may separate each speaker's utterances and automatically record them, in the case of an audio file that is recorded in a situation, such as a meeting, an interview, a business deal, and a trial, where a number of speakers make utterances in random order.

In step S420, the memo matching and management part 320 may receive from the client a memo written during recording or playback of the audio and manage the memo by matching it to the text transcript of the audio recording created in step S410. The memo matching and management part 320 may match the text transcript of the audio recording and the memo written during recording, based on the elapsed recording time. The text transcript of the audio recording may include a timestamp indicating when a speaker's utterance occurs, and the memo matching and management part 320 may manage a memo written during the utterance based on the timestamp of the audio recording. Likewise, the memo matching and management part 320 may match a text transcript of the audio recording to a memo written during playback of the audio, based on the time when the audio recording in the audio file is played back on the client. In other words, the memo matching and management part 320 may manage a memo written during an utterance spoken at a specific time by matching it to an audio recording corresponding to that time.

In step S430, upon receiving an instruction to select a text transcript of the audio recording from the client, the text transcript provision part 330 may provide the text transcript of the audio recording in connection with a memo matching the text transcript. The text transcript provision part 330 may show the text transcript and the memo together in a dual view so that the memo written during recording or playback of the audio is easily and conveniently viewed along with the audio recording. The dual view mode is a mode in which audio recordings and memos are shown side by side in two rows. This mode provides an interface in which a text transcript of an audio recording of speech and a memo written during recording or playback of the audio are shown side by side to make search for conversation records easier. The text transcript provision part 330 is also able to show either a text transcript or a memo alone depending on the client's selection.

FIGS. 5 to 15 illustrate an example of a user interface screen for audio recording management in an embodiment of the present disclosure.

FIGS. 5 to 15 show an example of an audio recording management screen 500 which is an interface screen on a dedicated application installed on the client or on a web/mobile site (i.e., the electronic devices 110, 120, 130 and 140) related to the computer device 200.

First, FIGS. 5 to 9 illustrate an example of the audio recording management screen 500 for explaining the process of creating an audio recording.

Figure 5:
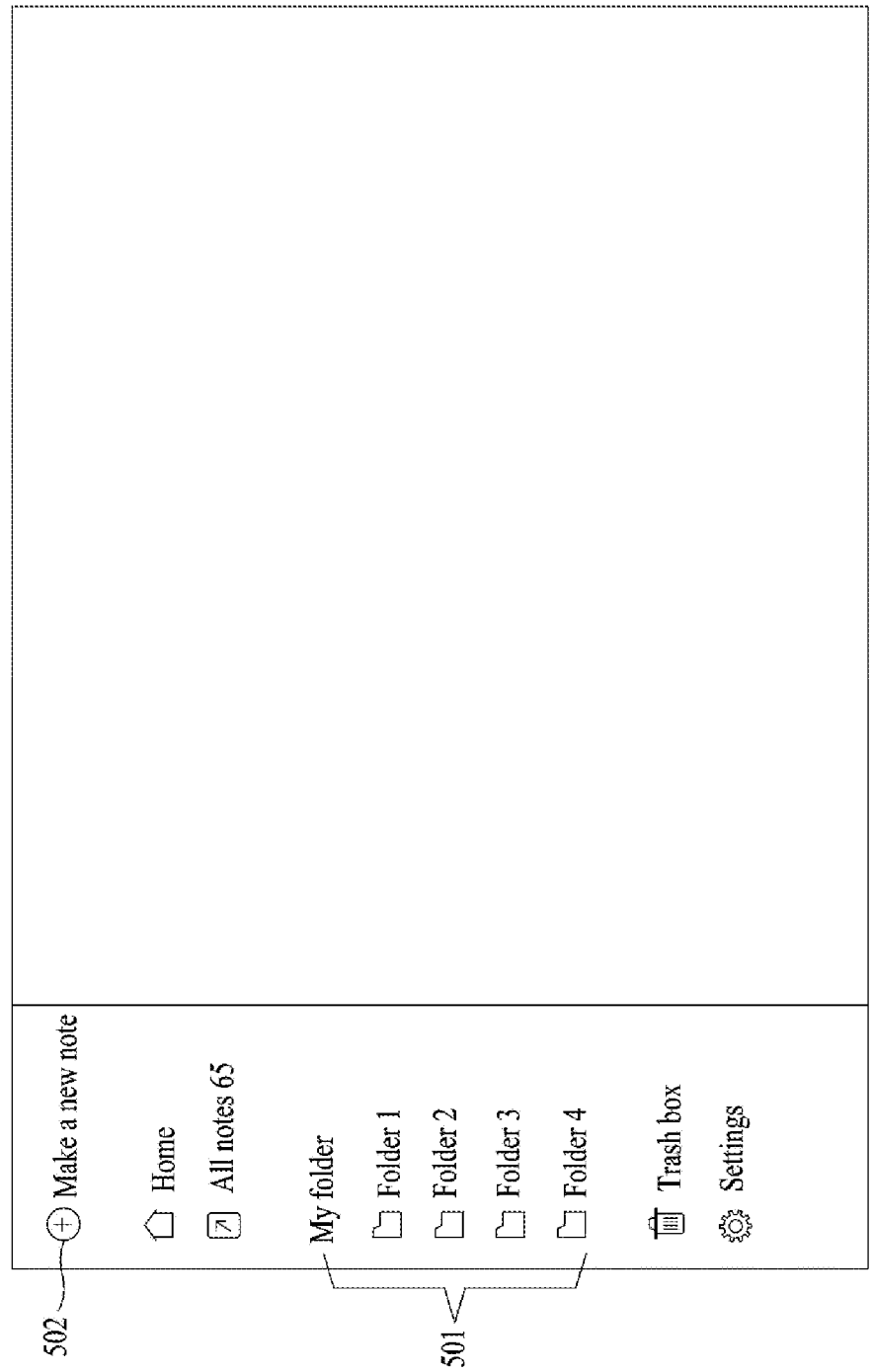

Referring to FIG. 5, the audio recording management screen 500 may include a list of main menus for providing service as a home screen configuration of an audio recording management service and, for example, may include a folder list 501 for managing audio recordings by folders. Also, the audio recording management screen 500 may include a "Make a new note" menu 502 for creating a new audio recording.

Figure 6:
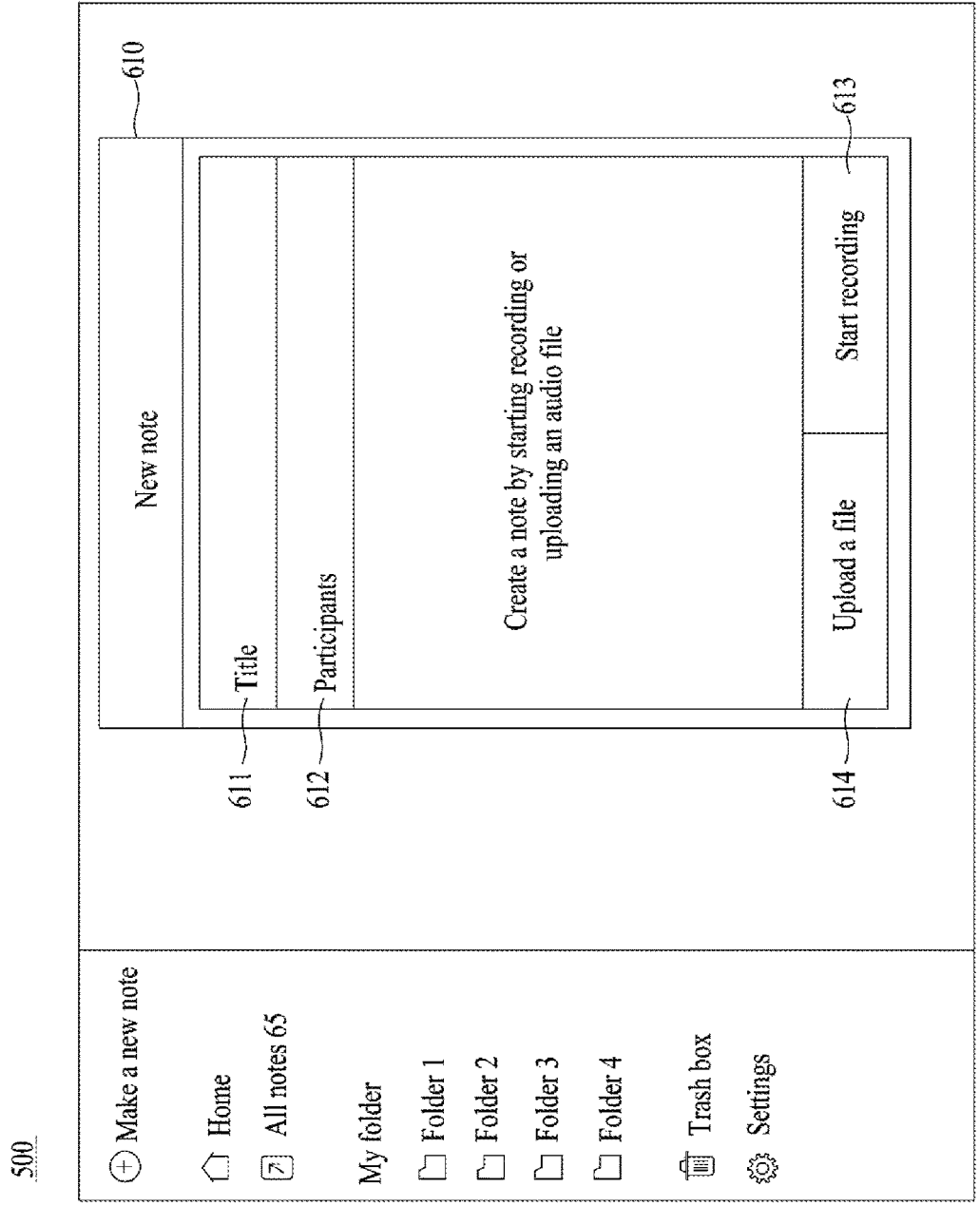

When the "Make a new note" menu 502 is selected on the audio recording management screen 500, the processor 220 provides an audio recording creation screen 610 as illustrated in FIG. 6. The audio recording creation screen 610 may include a "Participants" entry field 612 for entering participant information, a "Start recording" menu 613 for recording audio, and an "Upload a file" menu 614 for uploading an audio file. In other words, the processor 220 may provide a recording feature and a file upload feature in order to create an audio recording.

Figure 7:
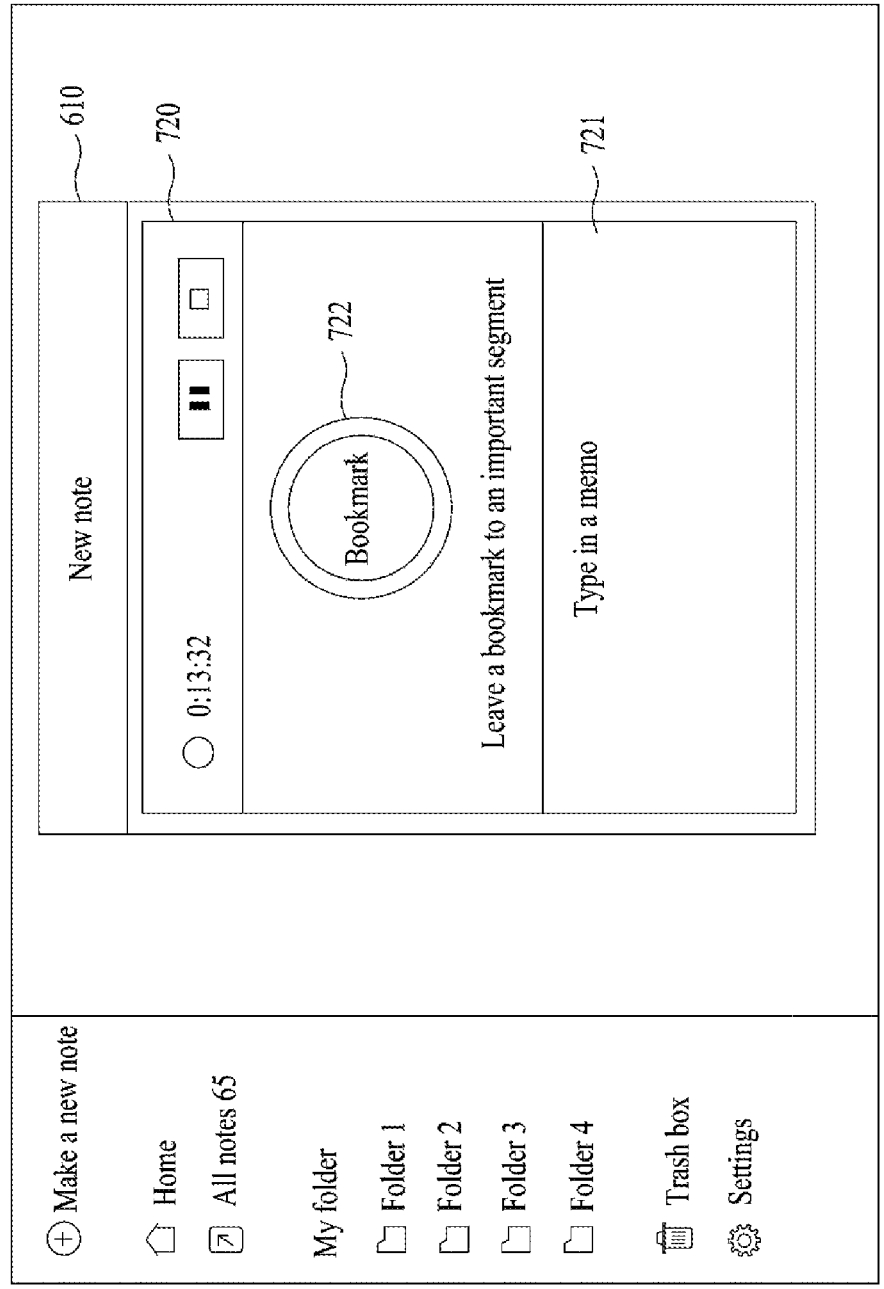

When the "Start recording" menu 613 is selected on the audio recording creation screen 610, the processor 220 provides an audio recording screen 720 as illustrated in FIG. 7. The audio recording screen 720 is a recording interface, which may include elapsed recording time, a pause button for pausing the recording, and a stop button for stopping the recording.

Particularly, the audio recording screen 720 may include a memo interface 721 for writing a memo during recording and a bookmark interface 722 for bookmarking during recording. In this case, the memo interface 721 may include a photo or video feature and a file attachment feature, as well as text-based entry. The user may write a memo of important information or attachments in relation to a corresponding audio during recording via the memo interface 721, and may leave a bookmark at the time of recording of an important segment via the bookmark interface 722. The memo or bookmark entered during recording may be written based on the elapsed recording time. For example, the elapsed recording time at the time the memo is created first may be recorded as the memo creation time, and the elapsed recording time at the time the bookmark is inserted may be recorded as the bookmarking time.

A bookmark for an audio recording may include, but not limited to, a bookmark that is manually set using the bookmark interface 722, and also may include a bookmark that is automatically set. For example, a segment in which a predetermined keyword (e.g., a title or tag of the audio recording) is uttered may be automatically bookmarked.

Figure 8:
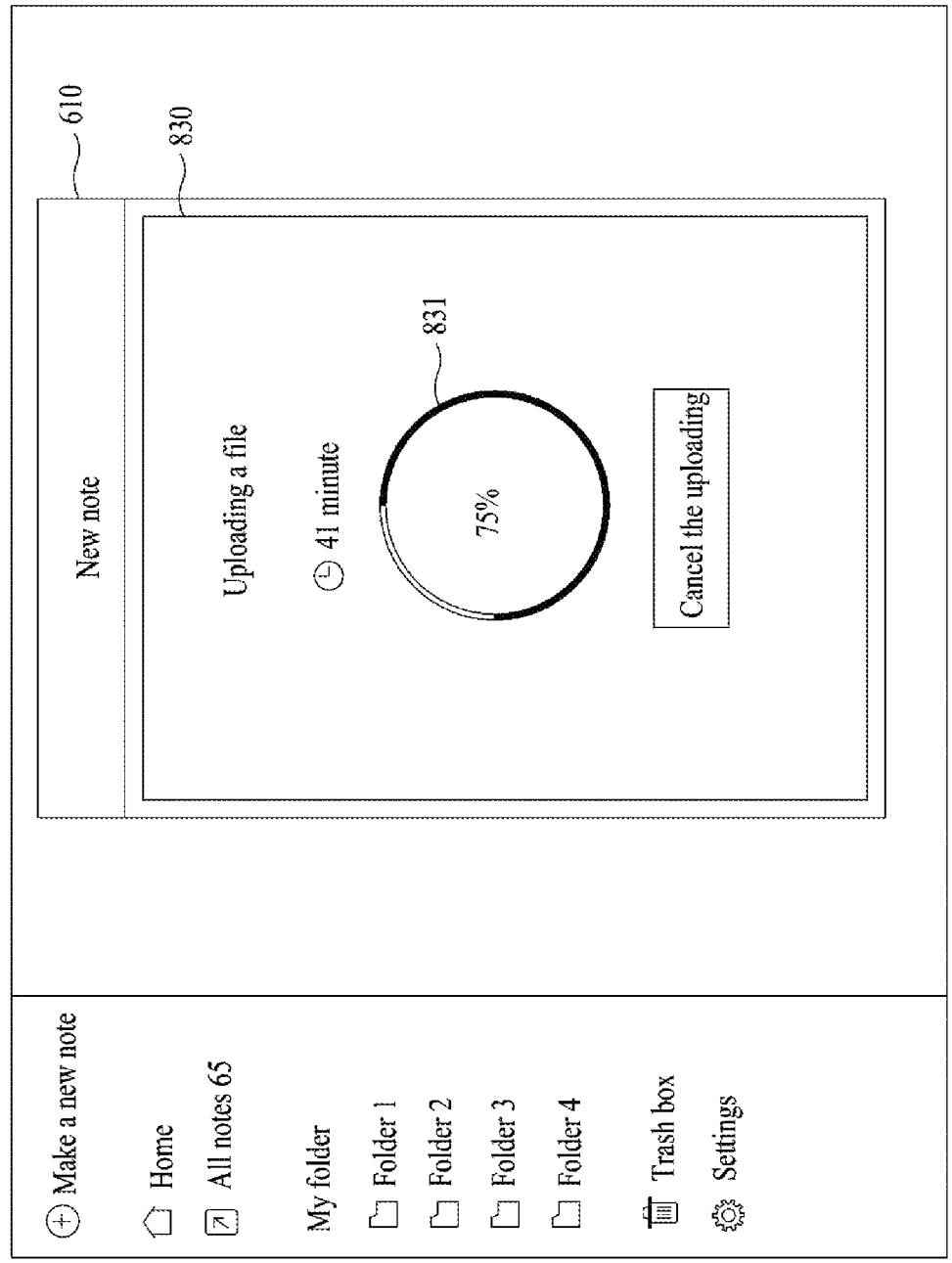

When the "Upload a file" menu 614 is selected on the audio recording creation screen 610, the processor 220 provides a file search screen for searching for an audio file to the client and, when a particular file is selected on the file search screen, the processor 220 provides a file upload screen 830 for executing uploading of the selected file, as illustrated in FIG. 8. The file upload screen 830 may include a progress bar 831 showing the progress of a file upload, along with information (e.g., file name, file length, etc.) on the selected file.

Figure 9:
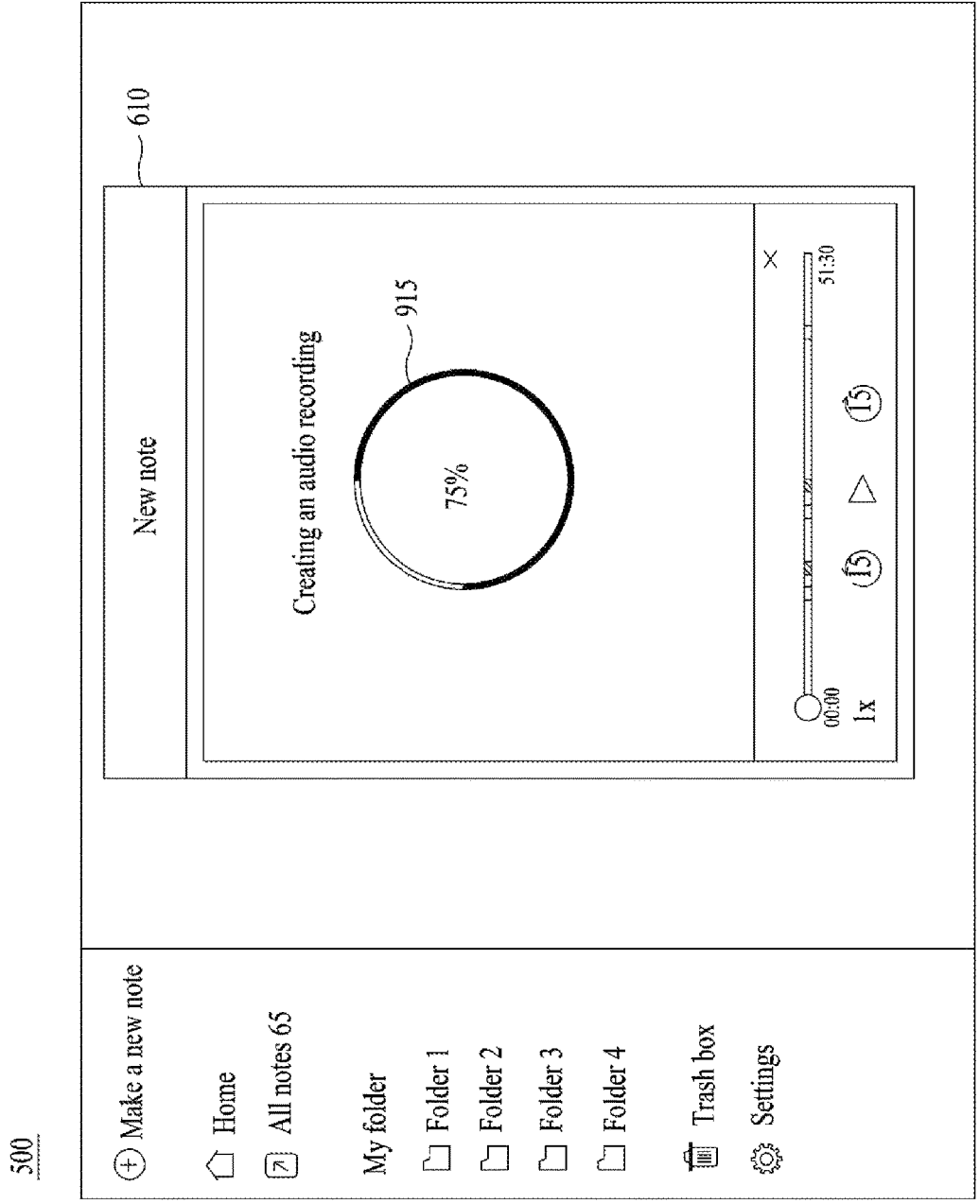

Once an audio recording through the audio recording screen 720 is completed or a file upload through the file upload screen 830 is completed, the processor 220 may then show on the audio recording creation screen 610 the progress 915 of a text transcript creation process for converting speech into text, as illustrated in FIG. 9. In the case of recording, once an audio file is uploaded in real time simultaneously with the recording or once the recording is completed, the recorded audio file may be fully uploaded.

For the audio file for which the text transcript creation process is completed, the processor 220 may provide a text transcript of the audio recording and a memo (and a bookmark) as well by matching them in terms of time.

Next, FIGS. 10 to 15 illustrate an example of the audio recording management screen 500 to explain the process of providing the text transcript of an audio recording.

Figure 10:
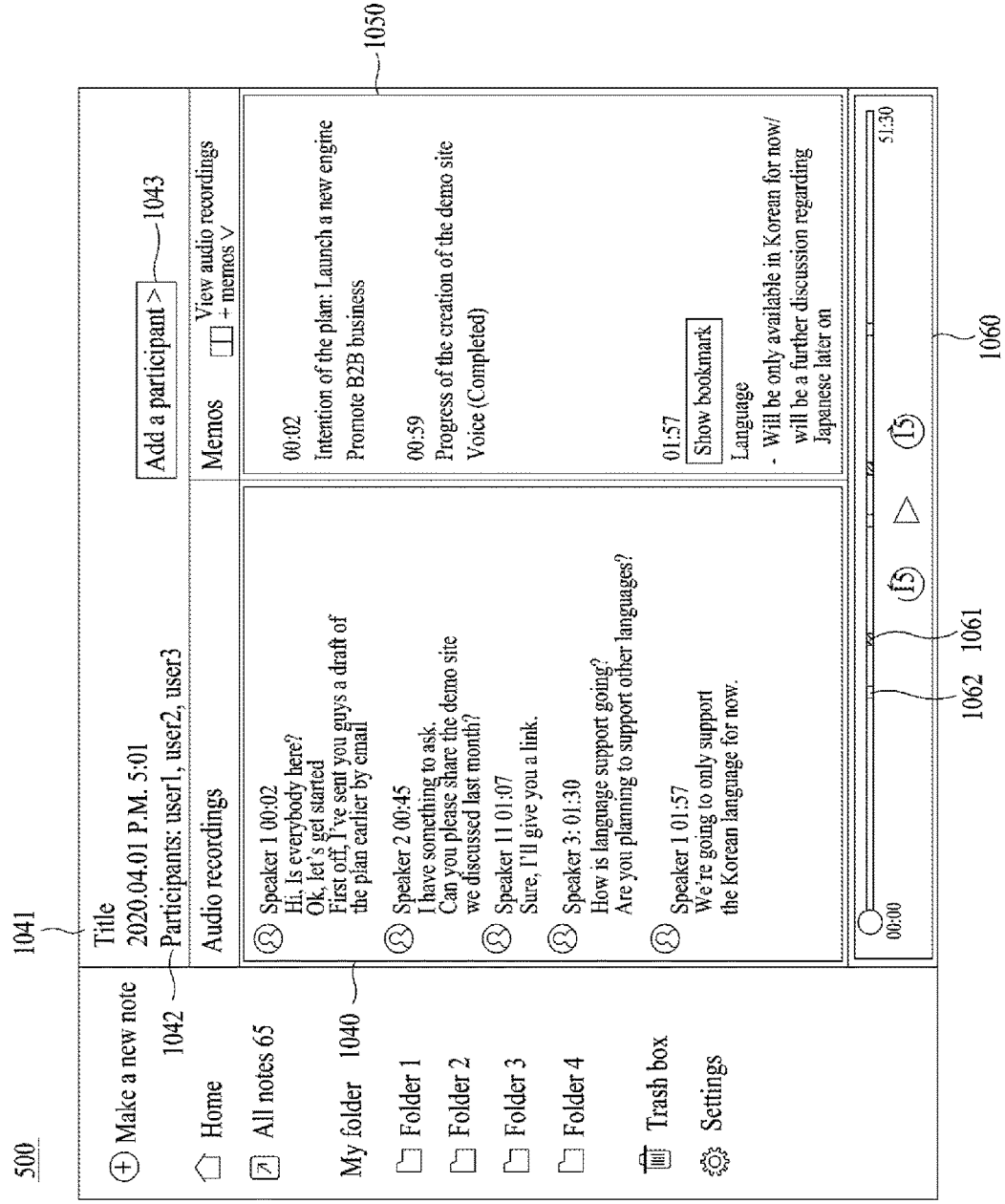

Referring to FIG. 10, when a particular audio recording is selected from a list of files provided on the audio recording management screen 500, the processor 220 may show a text transcript region 1040 and a memo region 1050 in a dual view for the audio recording with a corresponding title. A title 1041 and participant information 1042 entered in the text transcript creation process may be both provided on the audio recording management screen 500, and a controller region 1060 for controlling playback of the audio file may be included.

The text transcript region 1040 may display a text transcript of speech in each utterance. In this case, a timestamp may be displayed to indicate the time the speech corresponding to the text is uttered in the audio file. The memo region 1050 may display a memo written during the recording of the audio file, and the elapsed recording time at the time the memo is created may be displayed as a timestamp for the memo.

The processor 220 may show the text transcript region 1040 and the memo region 1050 side by side in two rows. In this case, the text transcript region 1040 and the memo region 1050 may be matched based on the timestamps. For example, the memo written at the time 00 mins 02 secs when Speaker 1 utters may be shown on the same line as the text in the corresponding utterance.

The text transcript region 1040 and the memo region 1050 may be arranged simply in time order, without being aligned parallel to each other based on the timestamps. The text transcript region 1040 and the memo region 1050 may be arranged in any other ways as long as they are shown in a dual view.

The controller region 1060 may include a progress bar, a play/pause button, a backward button, a forward button, a volume control button, and so on, and a memo indicator 1061 indicating a segment in which a memo is written and a bookmark indicator 1062 indicating a bookmarked segment may appear on the progress bar.

Different indicator display elements (e.g., color, shape, etc.) may be applied to the memo indicator 1061 and the bookmark indicator 1062 to easily distinguish them from each other.

When the user selects the text in a particular utterance from the text transcript region 1040, the processor 220 may play the audio in that utterance. Likewise, when a particular memo is selected from the memo region 1050, the audio in the segment in which that memo is written may be played.

The processor 220 may synchronize selected parts between the text transcript region 1040 and the memo region 1050. For example, when the user selects the text in a particular utterance from the text transcript region 1040, the processor 220 may highlight the memo written in that segment in the memo region 1050.

The user may view the text transcript region 1040 and the memo region 1050 at the same time, and also may see at a glance the location of the content of the conversation since the memo indicator 1061 and bookmark indicator 1062 on the progress bar within the controller region 1060 allow for easy and convenient search.

The audio recording management screen 500 may include a "Add a participant" menu 1043 to add people to share the text transcript of the audio recording. When the "Add a participant" menu 1043 is selected on the audio recording management screen 500, the processor 220 may provide the text transcript of the audio recording with the accounts of other users selected from a list of friends or through a messenger chatroom to share the text transcript. The URL of the text transcript of the audio recording may be shared through an account of the audio recording management service or by connecting to a messenger.

Figure 11:
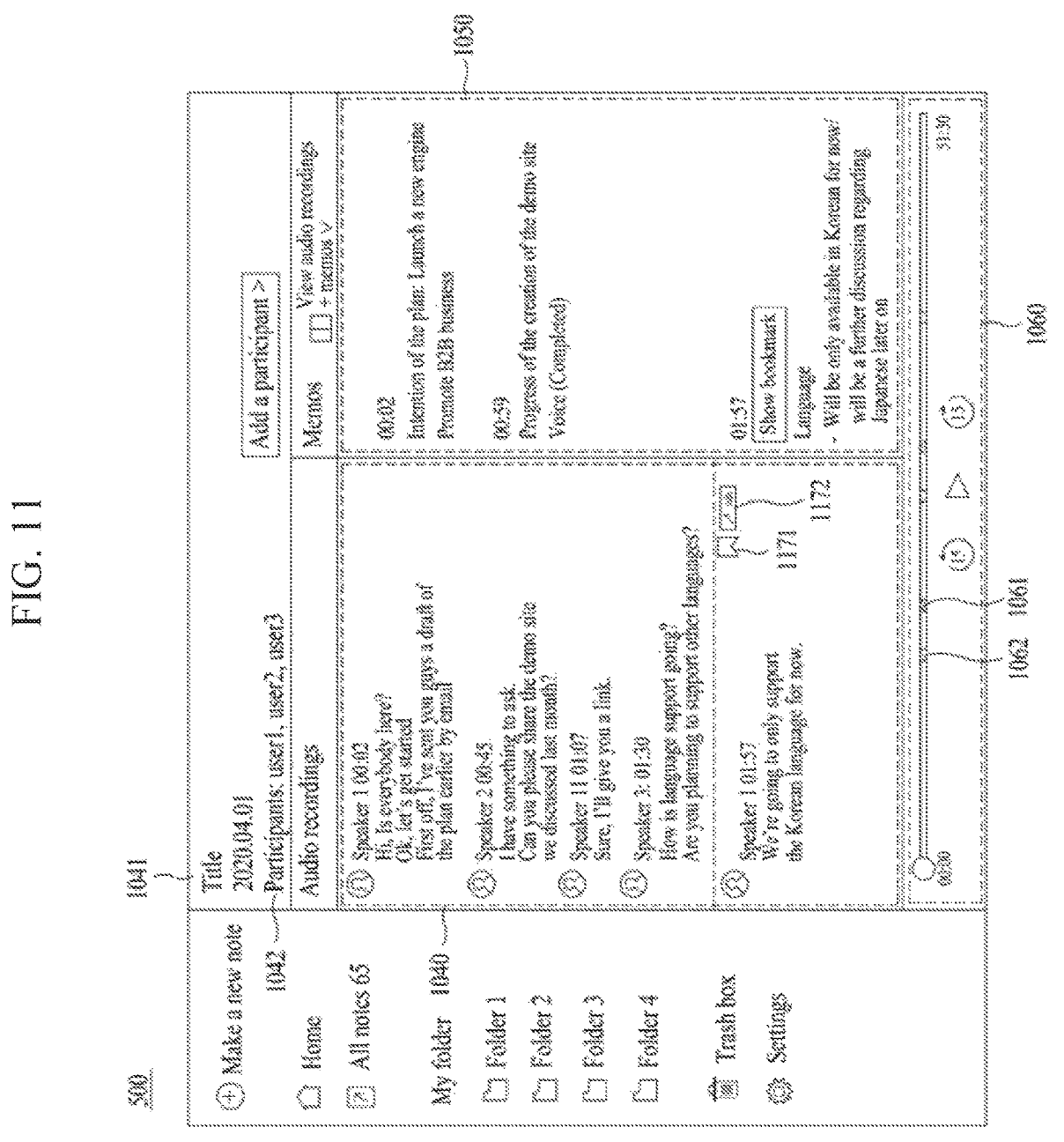

Referring to FIG. 11, the processor 220 may display the text in a bookmarked utterance in the text transcript region 1040 differently from the text in other utterances. For example, the text in that utterance may be marked with a bookmark icon 1171. Besides displaying the bookmark icon 1171, the text in the bookmarked utterance may be highlighted.

Moreover, the processor 220 may provide an "Edit" menu 1172 for the text in the bookmarked utterance in the text transcript region 1040 to let the user edit the text in the bookmarked segment.

Figure 12:
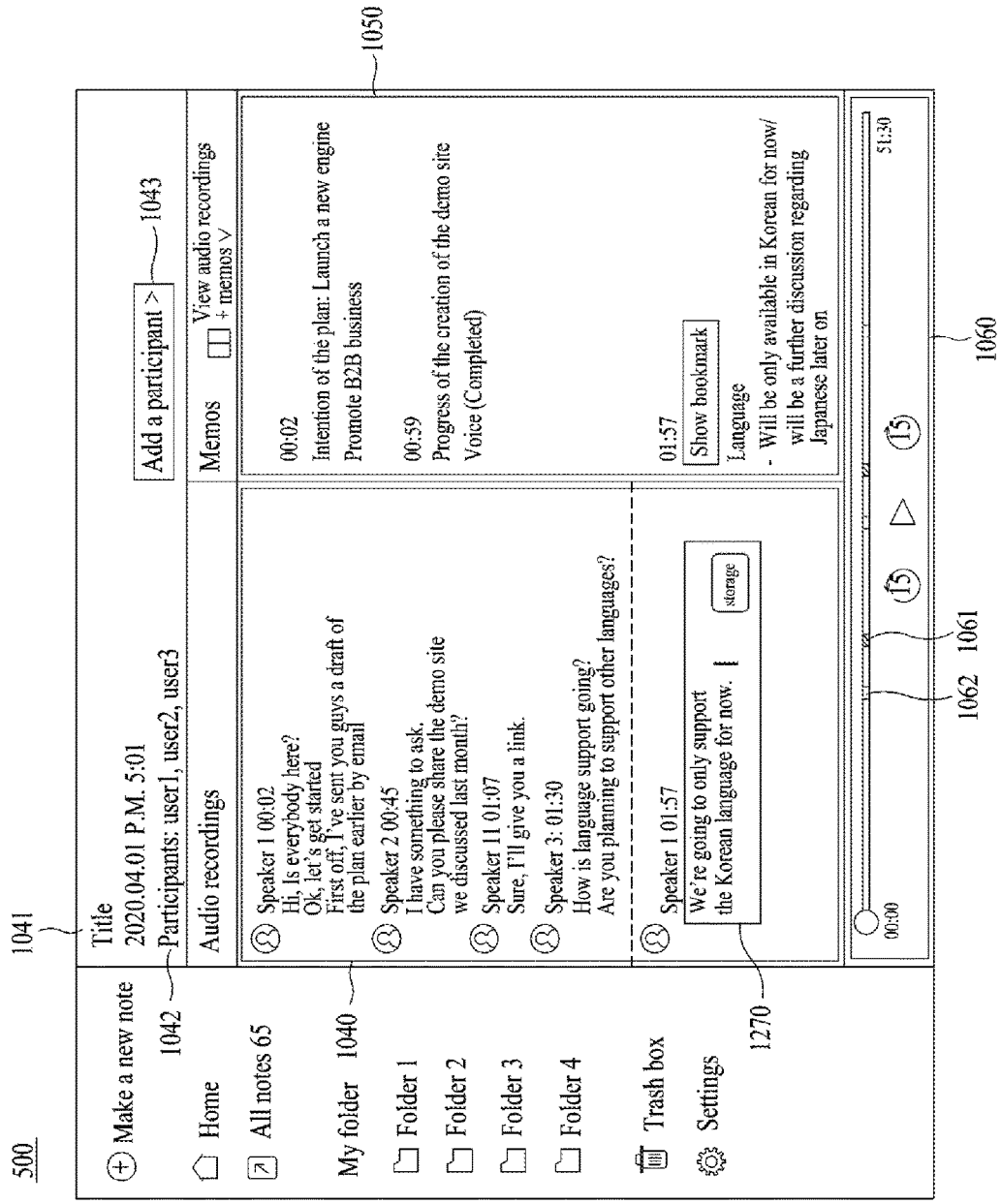

When the "Edit" menu 1172 is selected for the text in the bookmarked utterance in the text transcript region 1040, the processor 220 provides an edit screen 1270 for editing the text in that segment as illustrated in FIG. 12. The text in the bookmarked utterance in the text transcript region 1040 is updated as edited text through the edit screen 1270.

The processor 220 may provide an edit function for the text in each utterance as well as for the bookmarked segment in the text transcript region 1040, and also may provide a function for editing the memos included in the memo region 1050.

Moreover, the processor 220 may provide a filtering function in the text transcript region 1040 and the memo region 1050 based on grouping by speakers or keywords.

When a particular speaker is selected from the text transcript region 1040, the processor 220 may group at least either the text transcripts or memos for the speaker's utterances and display them. In other words, the audio recordings of utterances by a particular speaker and the memos written for the utterances by that speaker may be shown collectively.

Moreover, the processor 220 may group at least either the text transcripts of the audio recordings or memos containing a keyword entered by the user and display them. In a case where memos are grouped by keywords, memos containing the keyword or memos written in utterances containing the keyword may be grouped. Apart from speakers or keywords, various other criteria for classifying audio recordings and memos may be used.

Apart from the dual view mode in which the text transcript region 1040 and the memo region 1050 are shown together, the processor 220 may provide a view mode in which only either the text transcript region 1040 or the memo region 1050 is selectively displayed.

Figure 13:
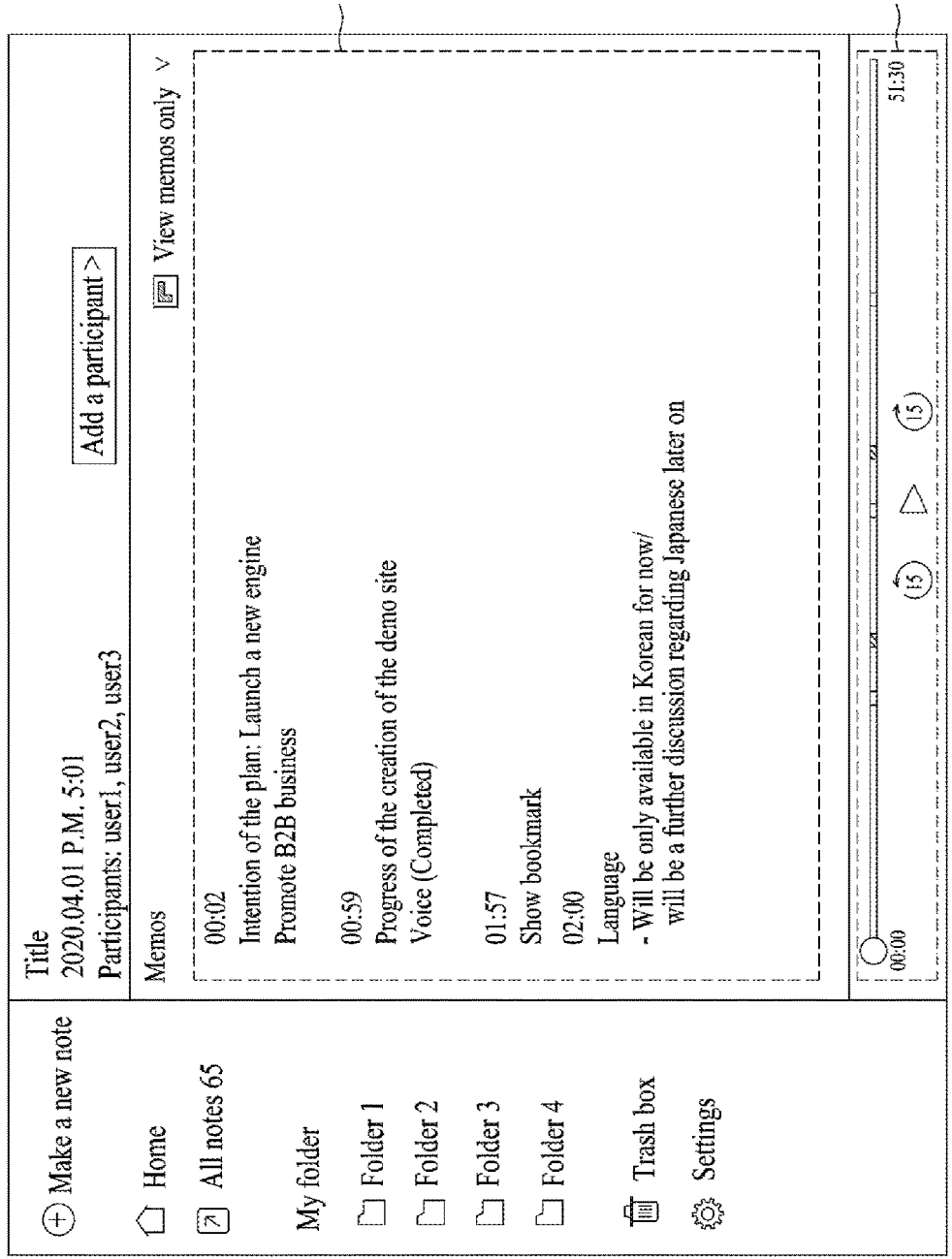

Referring to FIG. 13, the processor 220 may display the memo region 1050 alone without displaying the text transcript region 1040, in which case the processor 220 may provide the controller region 1060 as well to control the playback of the audio file.

The user may check the memos included in the memo region 1050 while listening to audio. Further, the processor 220 may provide an interface for adding a memo during playback of audio.

Referring to FIG. 14, the processor 220 may display the text transcript region 1040 alone without displaying the memo region 1050, in which case the processor 220 may provide the controller region 1060 as well to control the playback of the audio file.

In the view mode in which only the text transcript region 1040 is displayed, the text in an utterance with a memo written in the text transcript region 1040 may be displayed differently from the text in other utterances. For example, a memo icon 1441 may be displayed as a tag representing the memo written in the utterance of the text.

Figure 15:
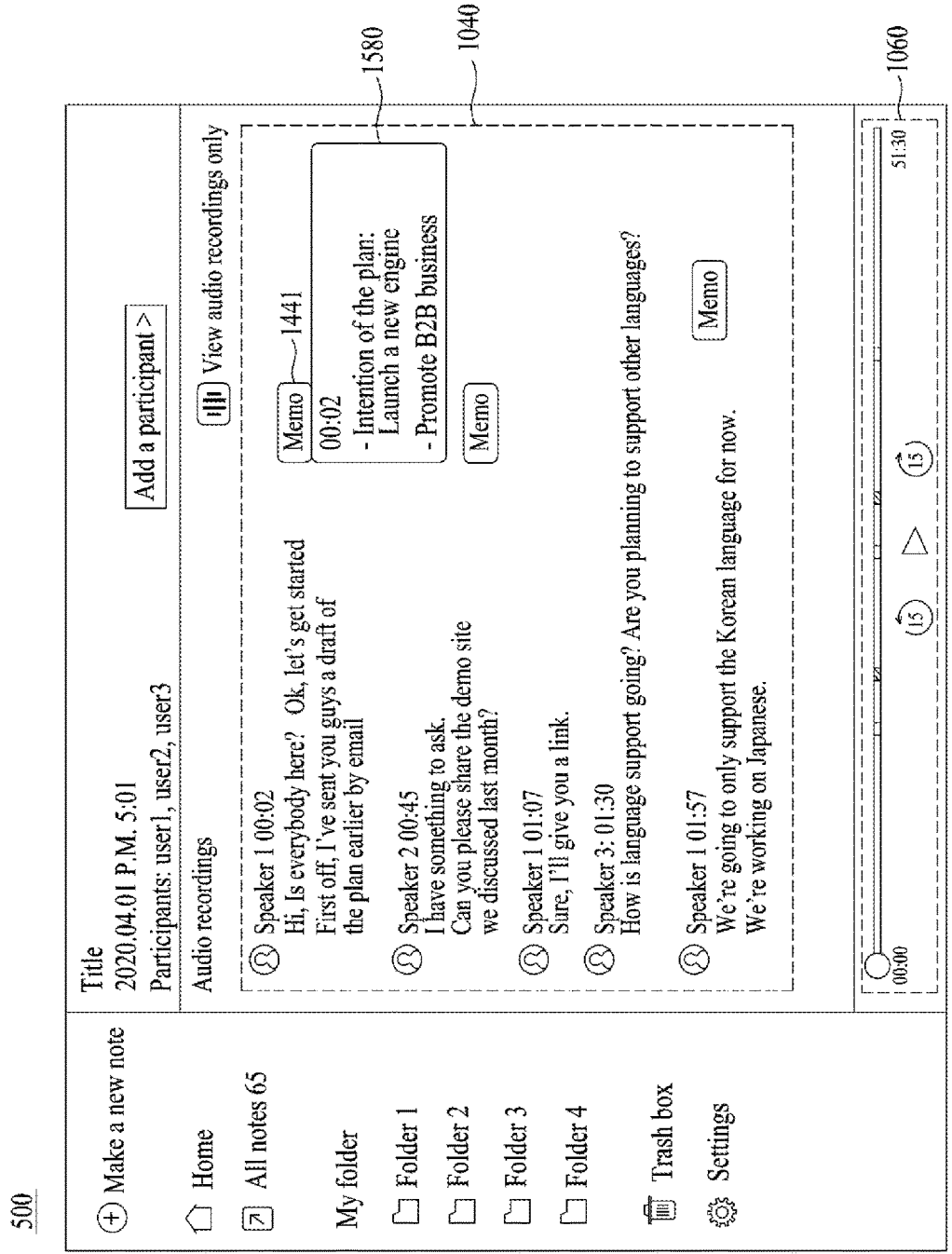

When the memo icon 1441 for a particular text is selected from the text transcript region 1040, the processor 220 may show the full memo 1580 written in the utterance of the text as illustrated in FIG. 15.

An interface that allows for mutual search and check may be provided in the view mode in which only the text transcript region 1040 or the memo region 1050 is displayed, as well as in the dual view mode in which the text transcript region 1040 and the memo region 1050 are shown at a time.

As such, according to the embodiments of the present disclosure, a text transcript of a recorded speech and a memo written in relation to the recorded speech may be matched and shown in a dual view, thereby making search for audio recordings and memos more convenient.

Moreover, according to the embodiments of the present disclosure, a filtering function for grouping audio recordings and memos by speakers or keywords may be provided, thereby enhancing the user's convenience.

The present embodiments allow for automatically managing an audio recording in connection with an artificial intelligent device that provides an audio-based interface.

Figure 16:
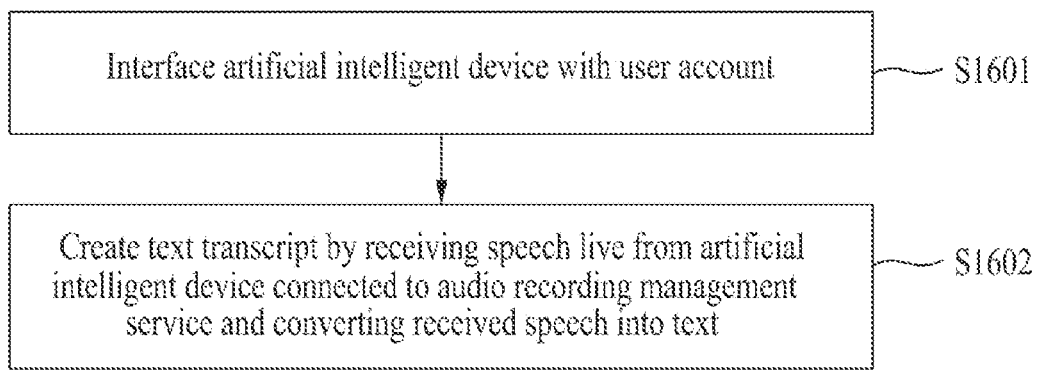
FIG. 16 illustrates an example of a text transcript creation process using an artificial intelligent device in an embodiment of the present disclosure.

FIG. 16 illustrates an example of a text transcript creation process using an artificial intelligent device in an embodiment of the present disclosure. The text transcript creation process of FIG. 16 is executed by the text transcript creation part 310, which may be included in step S410 included in the audio recording management method of FIG. 4.

Referring to FIG. 16, in step S1601, the text transcript creation part 310 may connect to an artificial intelligent device that provides an audio-based interface for an audio recording management service. For example, the text transcript creation part 310 may allow an artificial intelligent device to connect to a user account of the audio recording management service by using a key issued for connecting to the audio recording management service. When the user enters an audio command or a specified button to record live audio, the artificial intelligent device may request to connect to the audio recording management service. The text transcript creation part 310 may issue a one-time key in response to the request from the artificial intelligent device and then connect to the artificial intelligent device that has requested the issuing of a key upon receiving an input of the key for the audio recording management service. In other words, the text transcript creation part 310 may connect an artificial intelligent device and a user account from which the key issued in response to a request from the artificial intelligent device is entered for the audio recording management service. The text transcript creation part 310 may connect only one user account to each artificial intelligent device at a time, and may specify a user account connected to an artificial intelligent device as a master account.

In step S1602, the text transcript creation part 310 may create a text transcript by receiving speech live from an artificial intelligent device connected to the audio recording management service and converting the received speech into text. When a connection with the audio recording management service is initiated, the artificial intelligent device may switch to recording mode to record audio input live from the location of the artificial intelligent device. The artificial intelligent device may display a recording time on the display of the device, and may provide recording-related controller functions such as pause, replay, stop, etc. The text transcript creation part 310 may receive an audio file that is recorded live from the artificial intelligent device. The text transcript creation part 310 may receive a recorded file at regular time intervals (e.g, 5 minutes) while connected to the artificial intelligent device, or may receive the entire recorded file after the connection is disabled. Once the connection to the artificial intelligent device is initiated, the text transcript creation part 310 may provide status information of an audio file being recorded, through a service screen of a master account connected to the artificial intelligent device.

The memo matching and management part 320 may provide the master account connected to the artificial intelligent device with a memo writing function for an audio file being recorded through the artificial intelligent device. In other words, the master account may check the status of audio being recorded live, and the master account also may write a memo in real time for the audio file being recorded. The memo matching and management part 320 may receive a memo written through the master account and manage the memo by matching it to a corresponding text transcript of an audio recording, in the process of recording audio live from the artificial intelligent device.

The text transcript provision part 330 may provide an audio recording through the master account connected to the artificial intelligent device. When a predefined audio command or specified button is entered, the artificial intelligent device may disable the connection to the audio recording management service. After disconnected from the artificial intelligent device, the text transcript provision part 330 may provide the text transcript of the audio recording in connection with the matching memo on the service screen of the master account.

The text transcript provision part 330 may share the text transcript of an audio recording with other users added through the master account. The master may specify another user the master is involved with in the audio recording management service by adding a friend, and then share the text transcript of a live audio recording with the specified user. The user's account specified by the master may check the text transcript of the audio recording shared by the master. Another example of sharing the text transcript of the audio recording may include sharing the URL of the text transcript of the audio recording. For example, the text transcript provision part 330 may connect to a messenger and provide a URL to a chatroom with the user specified by the master through a chatbot account related to the audio recording management service, thereby allowing the specified user to check the text transcript of the audio recording.

FIGS. 17 to 22 illustrate an example of a user interface screen for audio recording management using an artificial intelligent device.

The artificial intelligent device 1700 provides an interface with an input/output device such as a microphone, a speaker, or a display, as well as an audio-based interface.

Hereinafter, a process of managing an audio recording in a meeting situation will be described.

Figure 17:
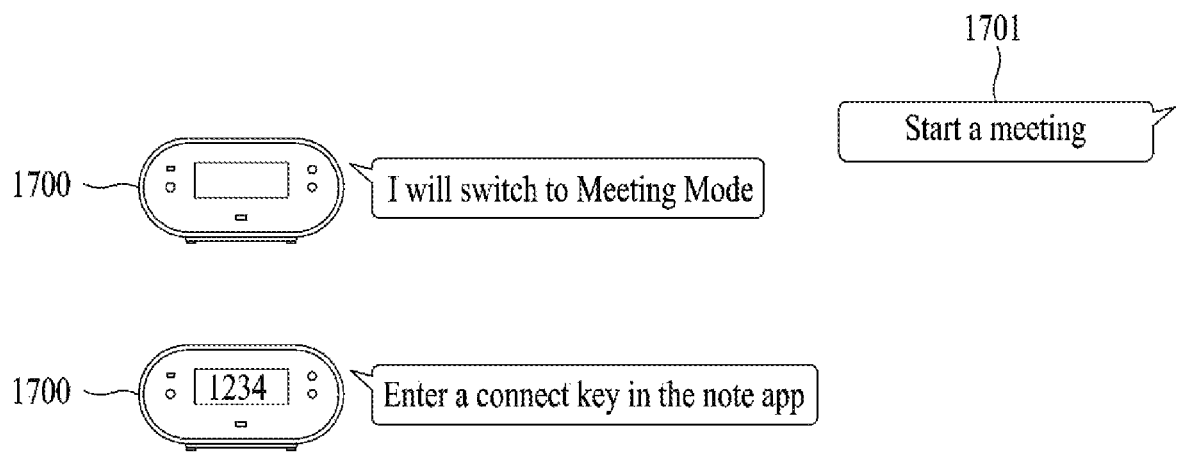
FIGS. 17 to 22 illustrate an example of a user interface screen for audio recording management using an artificial intelligent device.

Referring to FIG. 17, the artificial intelligent device 1700 may recognize an audio command 1701 containing a predetermined keyword as a user request for recording a meeting's audio. A user request for recording a meeting's audio may be entered by using a specified button on the artificial intelligent device 1700, as well as the audio command 1701 uttered by the user.

Upon recognizing the user request for recording a meeting's audio, the artificial intelligent device 1700 may request to connect to the audio recording management service. Hereupon, the processor 220 may issue a connect key in response to the request from the artificial intelligent device 1700.

The artificial intelligent device 1700 may receive the key issued in response to the connection request and display it on its display.

The user at the meeting may log in to a dedicated audio recording management app (or a web/mobile site of the audio recording management service) installed on a personal device such as a mobile device or PC and enter the key displayed on the artificial intelligent device 1700.

Figure 18:
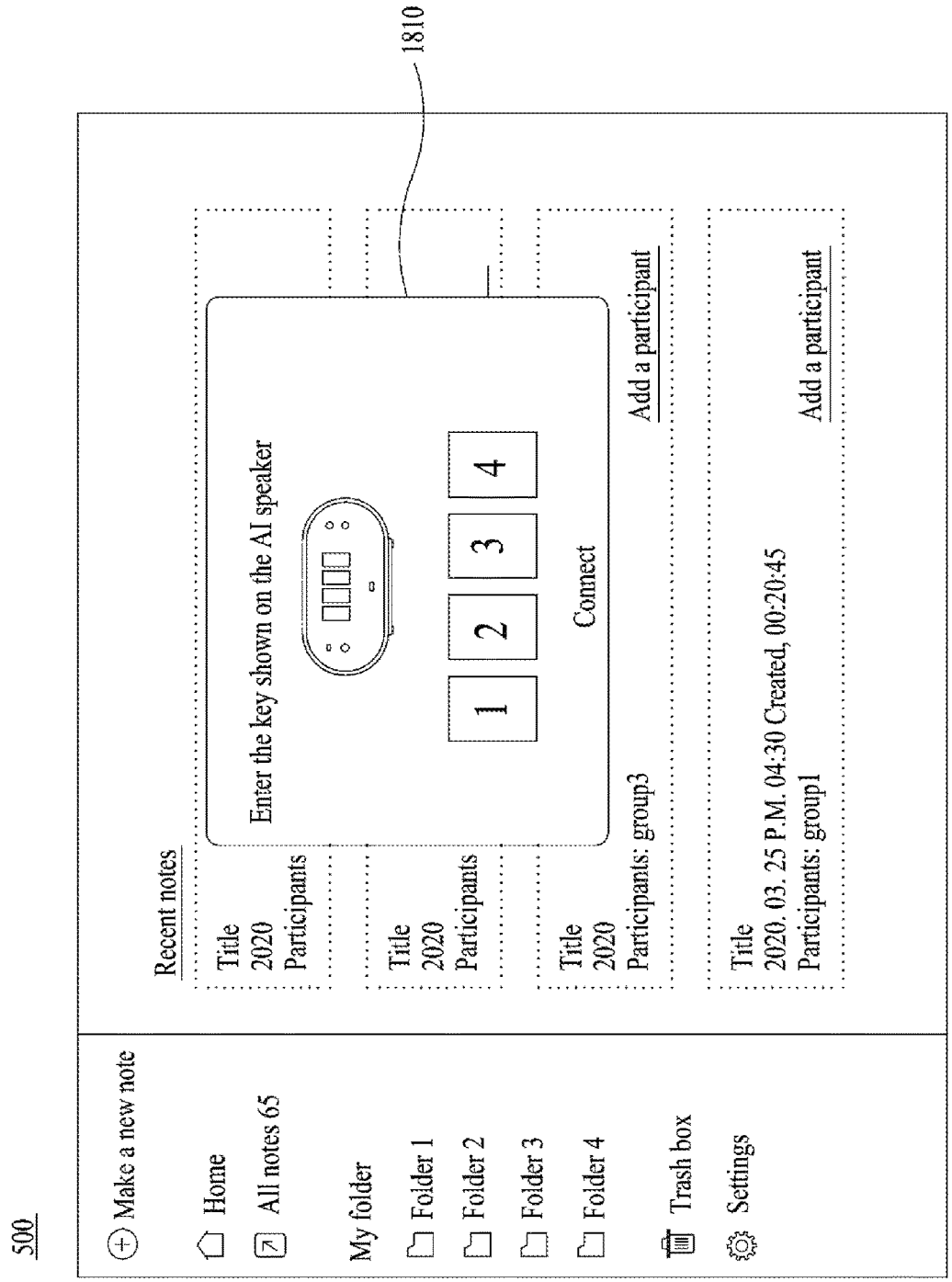

Referring to FIG. 18, when the user selects a menu for initiating a connection to the artificial intelligent device 1700 on the audio recording management screen 500, a key input screen 1810 may be provided. In this case, the user may enter the key displayed on the artificial intelligent device 1700 through the key input screen 1810.

If the key issued in response to the request from the artificial intelligent device 1700 is entered through the dedicated audio recording management app, the processor 220 may connect the user account that has entered the key to the artificial intelligent device 1700. The processor 220 may specify the user account connected to the artificial intelligent device 1700 as a matter related to the meeting's audio.

Figure 19:
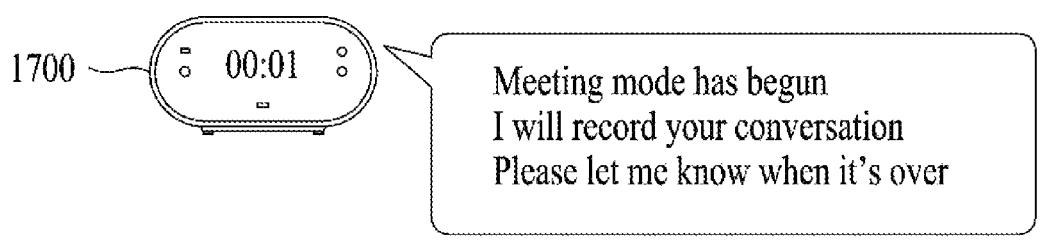

Referring to FIG. 19, once the connection to the audio recording management service is initiated, the artificial intelligent device 1700 switches to a recording mode and record the meeting's audio input live from the location of the artificial intelligent device 1700. While in recording mode, the artificial intelligent device 1700 may display the recording time on the display.

When the connection to the artificial intelligent device 1700 is initiated, the processor 220 may display status information related to the audio recording in the artificial intelligent device 1700 through the master account.

Figure 20:
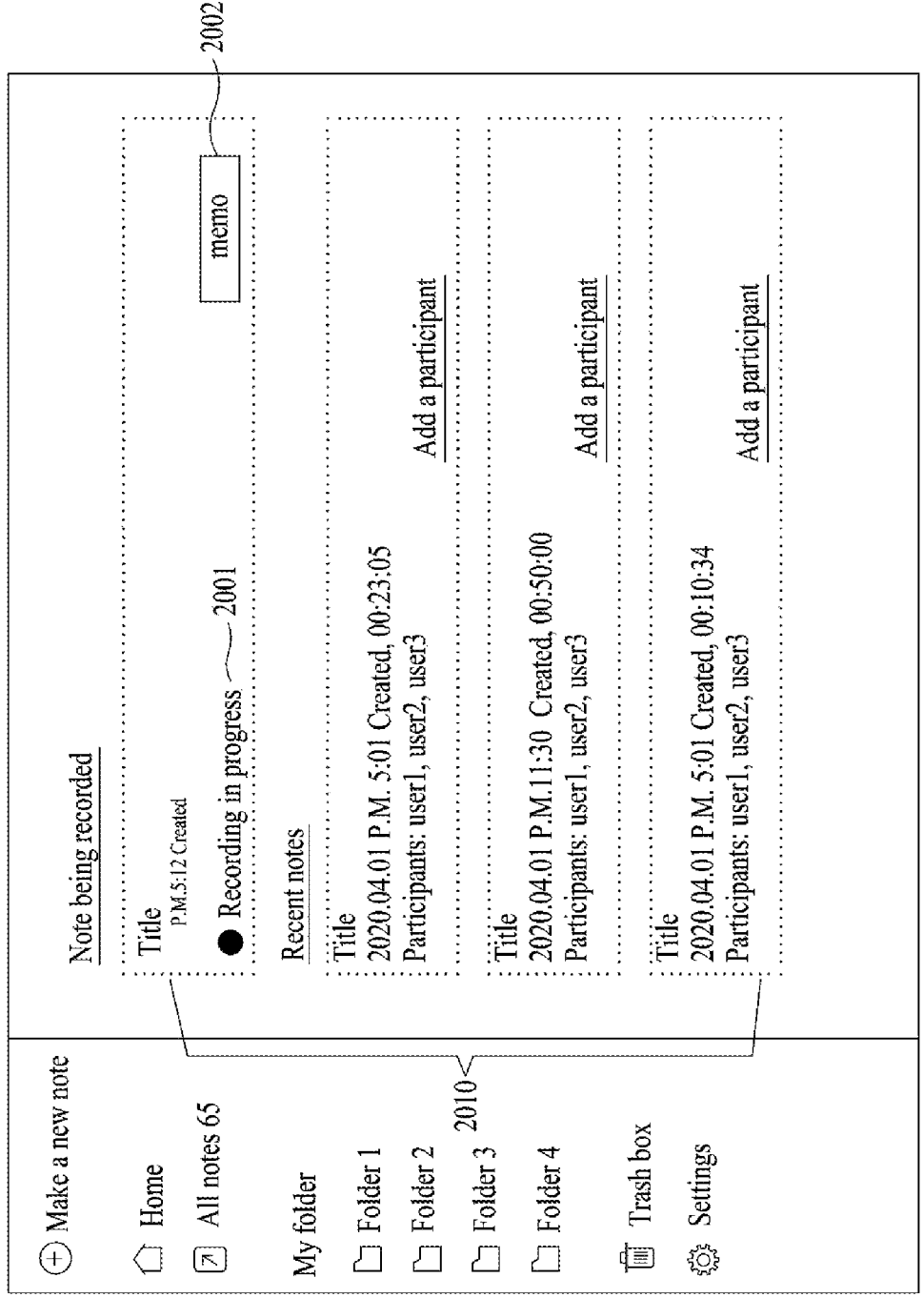

Referring to FIG. 20, the processor 220 may provide, on the audio recording management screen 500 of the master account, a file list 2010 containing an audio file being recorded from the artificial intelligent device 1700. The file list 2010 may contain an audio file being recorded from the artificial intelligent device 1700 and an audio file accessible through the master account, such as a text transcript of an audio recording. The processor 220 may display status information 2001 of an audio file being recorded from the artificial intelligent device 1700, that is, a status value on the artificial intelligent device 1700, in the file list 2010 on the audio recording management screen 500.

The processor 220 may display audio files in the file list 2010 differently depending on their status. For example, the audio files may be divided into audio files to which a memo can be added in real time and other audio files. The audio files to which a memo can be added in real time may include audio files being recorded from the artificial intelligent device 1700. As illustrated in FIG. 20, the processor 220 may provide a "Memo" menu 2002 for writing a memo for an audio file being recorded from the artificial intelligent device 1700, among the audio files included in the file list 2010 on the audio recording management screen 500.

Figure 21:
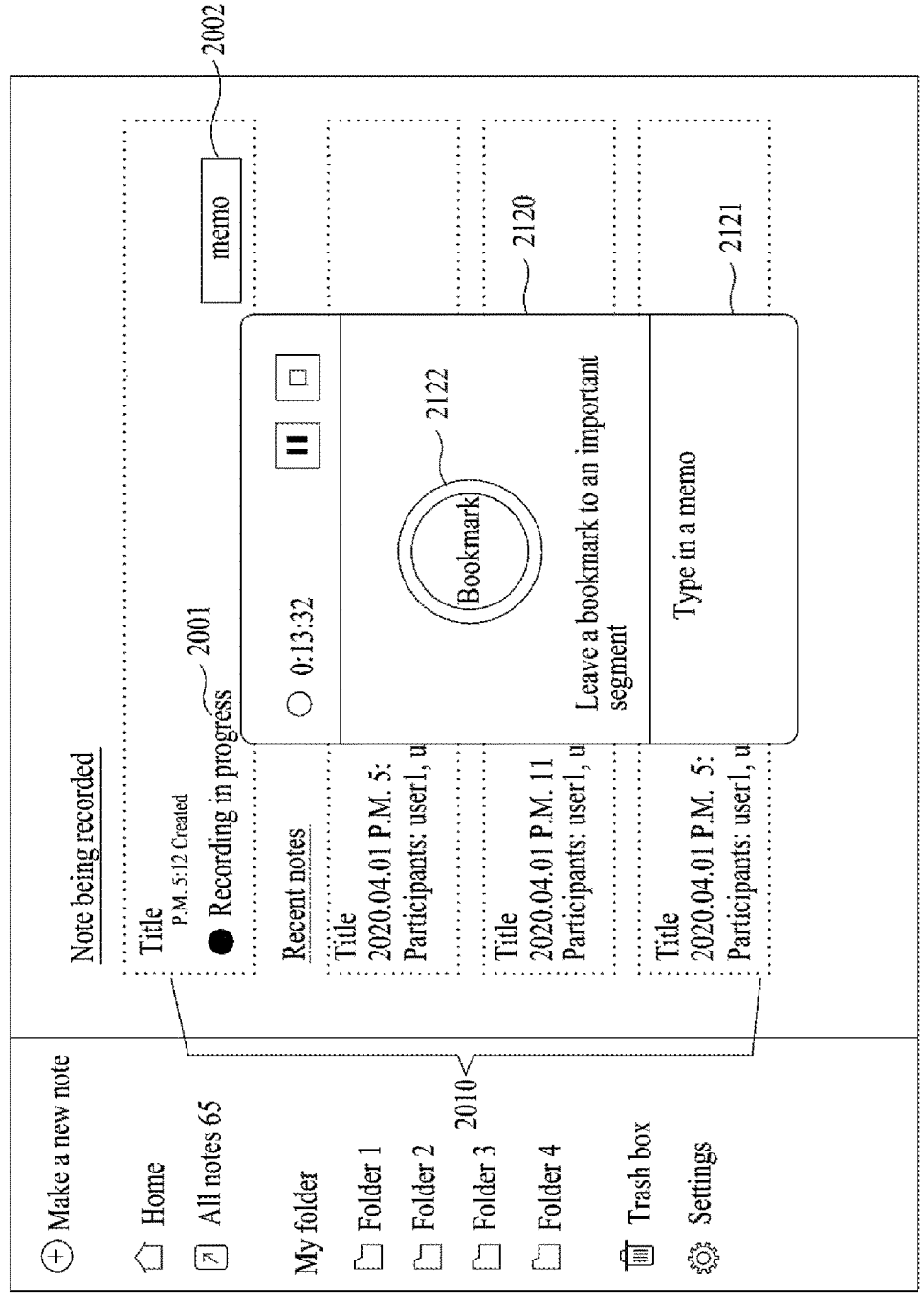

When the "Memo" menu 2002 is selected for an audio file being recorded from the artificial intelligent device 1700, from the file list 2010 on the audio recording management screen 500, the processor 220 provides a memo writing screen 2120 as illustrated in FIG. 21. The memo writing screen 2120 may display the status (recording) of the audio file being recorded from the artificial intelligent device 1700 and the recording time. Also, the memo writing screen 2120 is an interface 2121 for writing a memo, which may include a photo or video feature and a file attachment feature, as well as text-based entry. Moreover, the memo writing screen 2020 may further include a bookmark interface 2122 for bookmarking an audio file being recorded from the artificial intelligent device 1700. When a memo is written on the memo writing screen 2120, a timestamp may be displayed for each memo, based on the recording time of the audio file being recorded.

The "Memo" menu 2002 may be provided to access the memo writing screen 2120, but the present disclosure is not limited to this. In some embodiments, the "Memo" menu 2002 is not provided as a separate menu, but instead the memo writing screen 2120 may be included in a details screen accessed by selecting a particular audio file, for example, an audio file being recorded from the artificial intelligent device 1700, from the file list 2010.

When a memo for an audio file being recorded from the artificial intelligent device 1700 is written through the memo writing screen 2120, the memo may be linked to the audio file and viewed via a mobile app and a PC's web.

Figure 22:
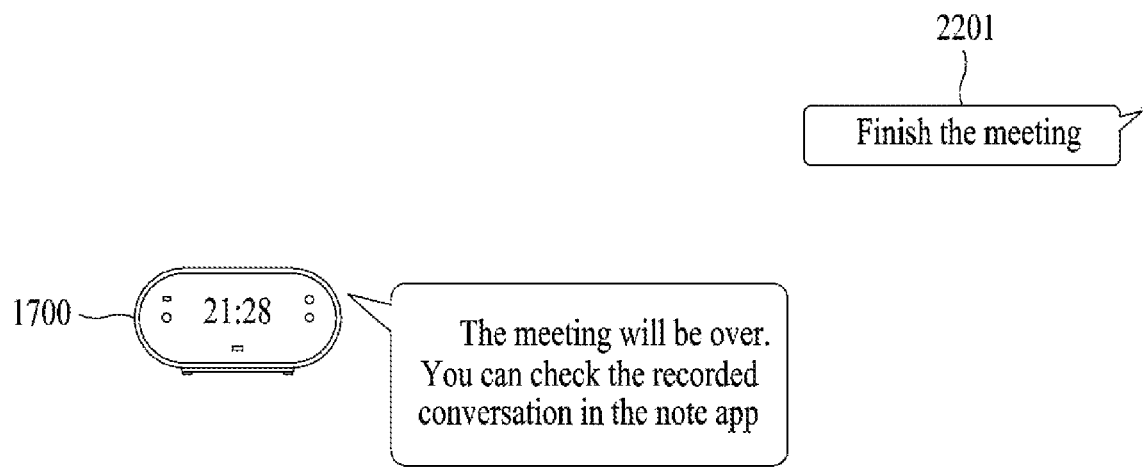

Referring to FIG. 22, the artificial intelligent device 1700 may recognize an audio command 2201 containing a predetermined keyword as a user request for finishing a meeting's audio recording. A user request for finishing a meeting's audio recording may be entered by using a specified button on the artificial intelligent device 1700, as well as the audio command 2201 uttered by the user.

Upon recognizing the user request for finishing a meeting's audio recording, the artificial intelligent device 1700 may request to disconnect from the audio recording management service. Hereupon, the processor 220 may disable the connection between the artificial intelligent device 1700 and the master account in response to the request from the artificial intelligent device 1700.

Once the connection to the audio recording management service is disabled, the artificial intelligent device 1700 may display the total recording time of the meeting's audio on the display.

Once the connection to the artificial intelligent device 1700 is disabled, the processor 220 may provide a text transcript of an audio recording of speech from the artificial intelligent device 1700 through the audio recording management screen 500 of the master account. Upon receiving a command for selecting a particular audio recording, the processor 220 may provide the text transcript of the audio recording in connection with a memo matching the audio recording.

As above, according to the embodiments of the present disclosure, an artificial intelligent device may be connected to an audio recording management service to automatically record live audio in text using a speech recognition technique, thereby expanding the use of the service and enhancing the user's convenience.

The present embodiments allow for improving speech recognition by using words entered by the user during recording of conversational speech in relation to the context of the conversation.

Figure 23:
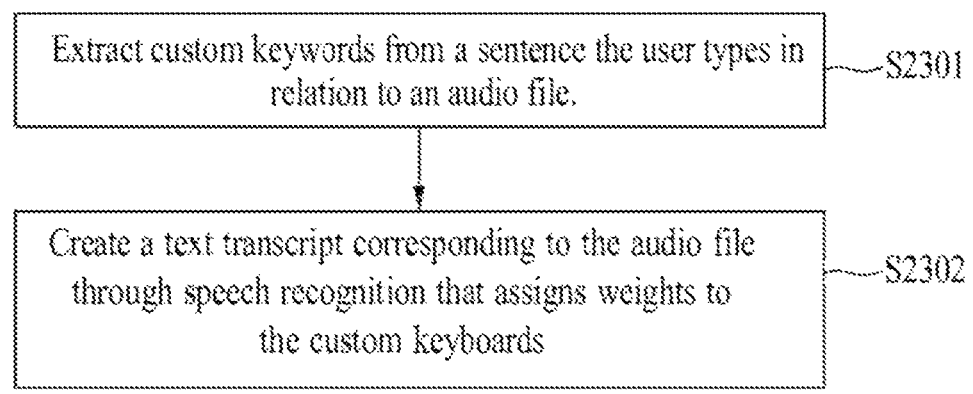
FIG. 23 is a sequential chart illustrating an example of a speech recognition process in an embodiment of the present disclosure.

FIG. 23 is a sequential chart illustrating an example of a speech recognition process in an embodiment of the present disclosure. The speech recognition process of FIG. 23 is executed by the text transcript creation part 310, and may be included in step S410 included in the audio recording management method of FIG. 4.

Referring to FIG. 23, in step S2301, the text transcript creation part 310 may extract custom keywords for speech recognition from a sentence the user types in relation to an audio file. For example, the text transcript creation part 310 may extract, as custom keywords, words corresponding to at least part of speech including nouns from a memo written in relation to the context of a conversation. For another example, the text transcript creation part 310 may extract, as custom keywords, words the user enters as information on an audio recording in the process of creating the text transcript of the audio recording—for example, words corresponding to at least part of speech including nouns from a title, tags, and participant information of an audio recording entered through the audio recording creation screen 610. For yet another example, the text transcript creation part 310 may extract, as custom keywords, words in a category related to a title of an audio recording the user enters within a prebuilt custom dictionary. For a further example, the text transcript creation part 310 may extract, as custom keywords, words corresponding to at least part of speech including nouns from the text transcript of the audio recording edited by the user—in other words, a last modified audio recording—by using an editing feature (e.g., the editing feature explained with reference to FIG. 12). For a further example, the text transcript creation part 310 may use frequently-used words registered as keywords by the user as custom keywords. In the process of registering frequently-used words, the processor 220 may provide suggested words based on the area of interest the user selects, by using a dictionary database included as a component of the computer device 200 or a dictionary database connectable to the computer device 200, and the user may register at least part of the suggested words as frequently-used words.

Also, the text transcript creation part 310 may extract a custom keyword by assigning a weight based on the class or type of a word. The text transcript creation part 310 may extract a word as an important keyword if the word is more unique than a generally used word. For example, the text transcript creation part 310 may assign a higher weight value to a proper noun than to a general noun (common noun) in extracting a custom keyword.

Moreover, the text transcript creation part 310 may exclude a word entered by the user if the word is deemed obviously erroneous or missing through error checking such as spellchecking in extracting a custom keyword.

In step S2302, the text transcript creation part 310 may create a text transcript of the audio recording corresponding to an audio file through speech recognition that assigns weights to the custom keywords extracted in step S2301. The text transcript creation part 310 may learn to recognize the custom keywords more accurately by applying a boosting algorithm to the custom keywords in the process of creating a text transcript of an audio recording. In other words, the text transcript creation part 310 may increase the recognition rate of the custom keywords by assigning speech recognition weights to the custom keywords so that they are processed as higher priority than other keywords.

Figure 24:
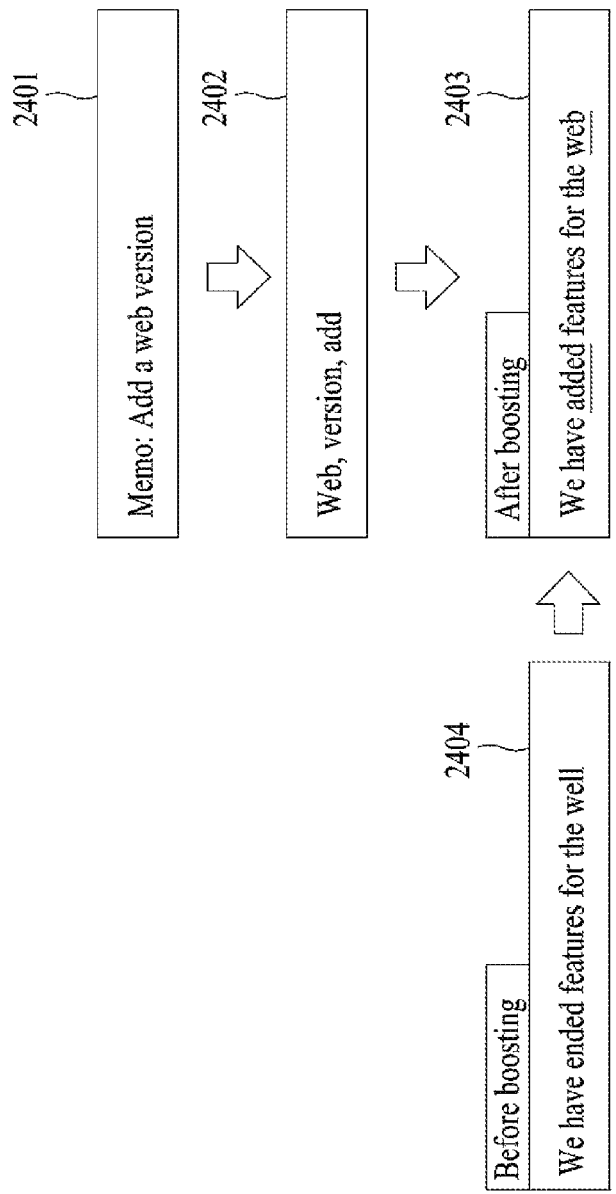
FIG. 24 illustrates an example of a result of speech recognition using words entered by the user in an embodiment of the present disclosure.

Referring to FIG. 24, the text transcript creation part 310 may extract custom keywords 2402<"web", "version", "add"> in a memo 2401<Add a web version> written during recording of an audio, and may acquire an improved speech recognition result 2403 through speech recognition that applies boosting to the custom keywords 2402. If a pre-boosting speech recognition result 2404 is "We have ended features for the well", a more accurate speech recognition result 2403 such as "We have added features for the web" by boosting the custom keywords 2402<"web", "version", "add">. For example, a speech recognition engine may tune every similar word of "web", such as "well", and replace it with "web" by using the custom keywords 2402.

In some embodiments, custom keywords may be extracted from a memo matching a speaker's utterance based on a speech recognition result, and these keywords may be boosted. In other words, the text transcript creation part 310 may apply different custom keywords for each utterance by a speaker.

After a text transcript of the audio recording is created, if the user edits a word in the text transcript and this word is acquired as a custom keyword, a text transcript creation process for converting speech into text may be performed again to update the text transcript. The text transcript creation part 310 may apply boosting to a word, i.e., custom keyword, edited by the user in the text transcript updating process.

As such, according to the embodiments of the present disclosure, boosting may be applied to words entered by the user during recording of conversational speech in relation to the context of the conversation, allowing for more accurate recognition of the words in the process of converting recorded speech into text. Also, it is possible to learn words entered by the user, including words entered by the user during recording of conversational speech, words edited by the user in a text transcript of an audio recording of speech, and words frequently used by the user, and this improves the accuracy of speech recognition.

The present embodiments allow for looking up words with a similar pronunciation in a text transcript of an audio recording of speech.

Figure 25:
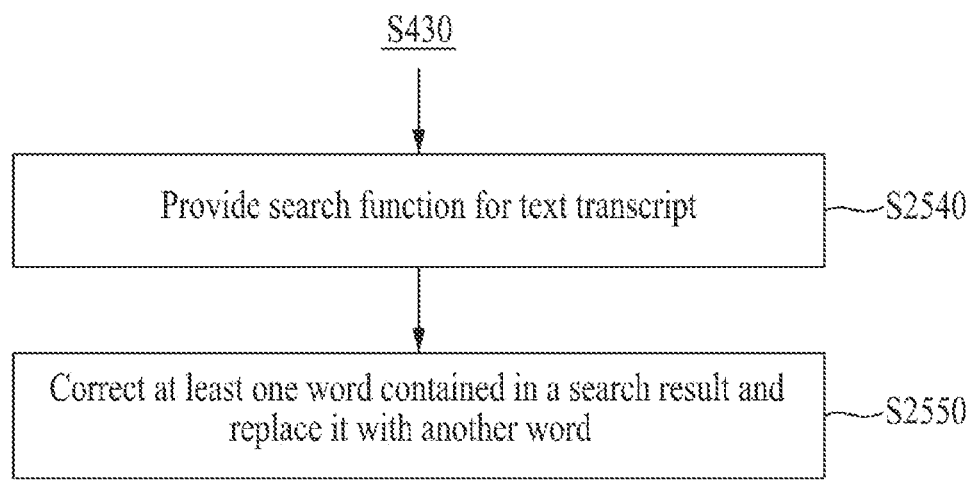
FIG. 25 is a sequential chart illustrating an example of an audio recording management process in an embodiment of the present disclosure.

FIG. 25 is a sequential chart illustrating an example of an audio recording management process in an embodiment of the present disclosure. The audio recording management process of FIG. 25 is executed by the text transcript provision part 330, and may be included in the audio recording management method of FIG. 4.

Referring to FIG. 25, in step S2540, the text transcript provision part 330 provides a search function for the text transcript provided in step S430, which allows for looking up words corresponding to a search word and words with a similar pronunciation to the search word in the text transcript. In other words, the text transcript provision part 330 may provide a function of finding similar words in pronunciation when looking up a particular word in the text transcript.

For example, the text transcript provision part 330 may look up English synonyms or borrowed words matching a search word, as well as synonyms for the search word, in the text transcript. Particularly, the text transcript provision part 330 may look up different words whose similarity to the search word in meaning is a certain percent or more, among words uttered with a similar pronunciation to the search word, by comparing words depending on what types of smaller units the words are broken down into—for example, phonemes, stems, terms, and so on.

The text transcript provision part 330 may provide a filtering function in the search process, based on accuracy which represents how a word is similar to a search word. For example, the text transcript provision part 330 may provide a search result by doing a targeted search for words that are 90% or more similar to the search word according to the user's request, and may exclude words whose similarity to the search word is 90% or less from the search result.

A search range may include a text transcript and a memo matching the text transcript, and the text transcript provision part 330 may look up words matching a search word and words with a similar pronunciation to the search word in the text transcript and the memo.

Also, the text transcript provision part 330 may allow search for a combination of words in the search process. In other words, the text transcript provision part 330 may support search using multiple words. A sentence-based search, as well as a word-based search, may be implemented.

The text transcript provision part 330 may provide a search result for a text transcript. In this case, words in the text transcript that are included in the search result may be displayed differently from the other words. For example, the text transcript provision part 330 may display a display element (e.g., highlight color) of a word included in the search result depending on the accuracy. For example, a word that matches the search word 90% or more may be highlighted in blue, a word whose similarity to the search word is less than 90% and more than or equal to 70% may be highlighted in sky blue, and a word whose similarity to the search word is less than 70% and more than or equal to 50% may be highlighted in gray.

In step S2550, the text transcript provision part 330 may correct at least one word contained in the search result and replace it with another word. For example, the text transcript provision part 330 may correct a word contained in the search result and replace it with a word entered as a keyword or a new word entered by the user. In this case, the text transcript provision part 330 may correct all the words contained in the search result or selectively correct some of the words contained in the search word depending on the user's selection.

Accordingly, the processor 220 may provide a function for looking up words uttered with a similar pronunciation to a search word in a text transcript of an audio recording of speech, and also may provide a correction function for replacing a found word with another word.

Figure 26:
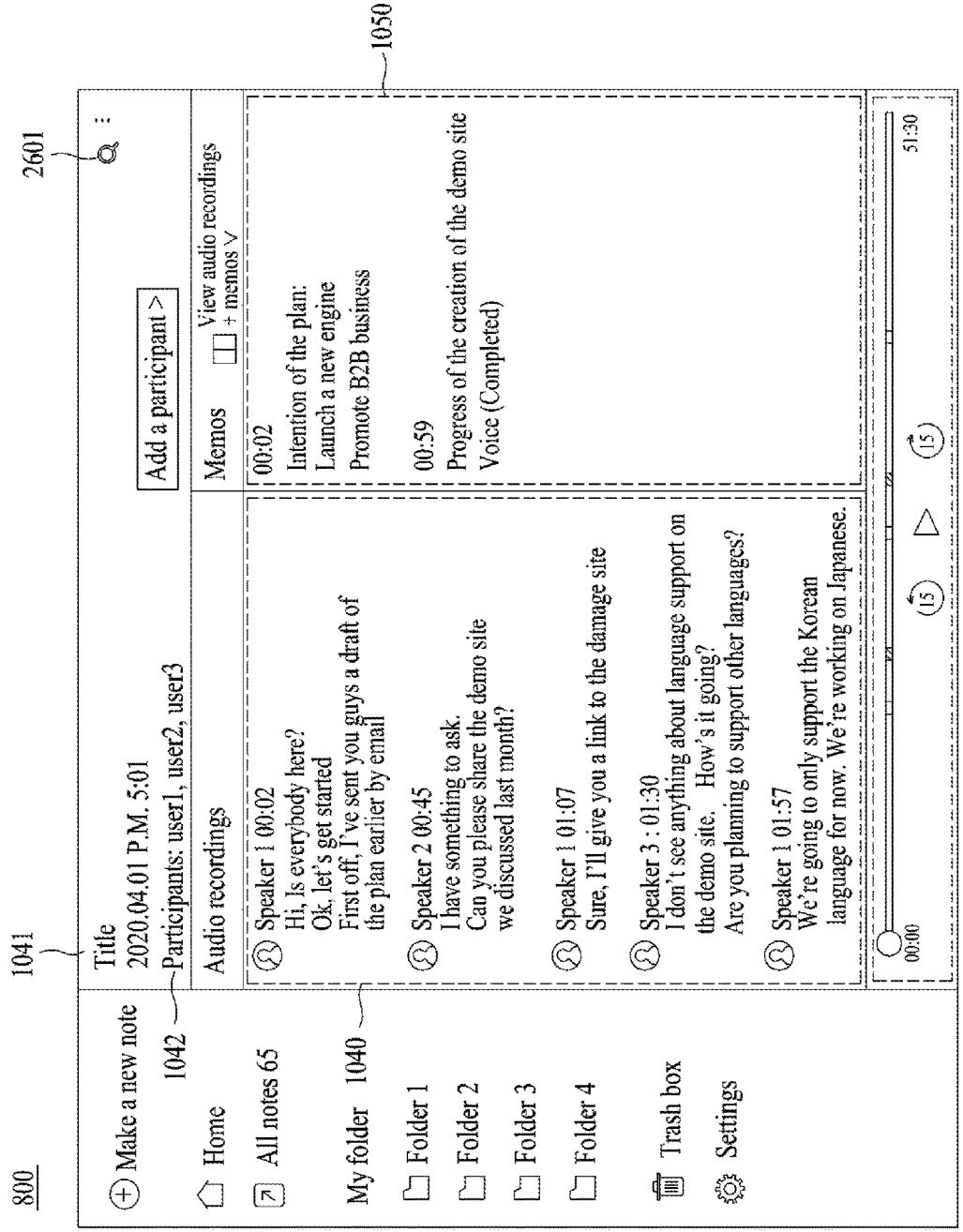

FIGS. 26 and 27 illustrate an example of a user interface screen for a text transcript search function in an embodiment of the present disclosure.

When a particular audio recording is selected from the folder list 501 provided on the audio recording management screen 500, the processor 220 may show a text transcript region 1040 and a memo region 1050 in a dual view for the audio recording with a corresponding title.

As illustrated in FIG. 26, the audio recording management screen 500 may include a "Search" menu 2601 for search. When the "Search" menu 2601 is selected on the audio recording management screen 500, the processor 220 may provide a search screen 2770 for the corresponding audio recording, as illustrated in FIG. 27.

The search screen 2770 may include a search word entry field 2771 for entering a search word, and the processor 220 may look up words corresponding to the search word and words with a similar pronunciation to the search word in a particular text transcript and show a search result.

In speech-to-text conversion, some words may be recognized as different words depending on their pronunciation, which may make the search difficult. For example, when two people utter the same words "demo site", the speech of one of them may be accurately recognized as "demo site" but the speech of the other may be recognized as "damage site". Upon receiving a search word "demo site" as input, the processor 220 may provide a search result containing the words "damage site" with a similar pronunciation, as well as the words "demo site" in the text transcript.

The processor 220 may highlight a word contained in a search result for the search word on the search screen 2770. In this case, each word contained in the search result may be highlighted in a different color depending on the accuracy of the word. A word in the search result that accurately matches the search word may be displayed as a highlighted area 2772 in a first color (e.g., blue), and a word that does not match the search word but has a similar pronunciation may be displayed as a highlighted area 2773 in a second color (e.g., sky blue) which is different from the first color.

In a case where filtering is enabled for a search result—for example, a search result is set with a search condition that requires the words in the search result to be 90% or more similar to the search word, the processor 220 may display words that comply with this condition as the search result.

The processor 220 may search both the text transcript region 1040 and the memo region 1050 using the search word. Alternatively, the processor 220 may selectively search either the text transcript region 1040 or the memo region 1050 according to the user's settings.

The processor 220 may provide a function for correcting a word contained in the search result and replacing it with the search word, as well as the search function for the text transcript. The processor 220 may find "damage site" with a similar pronunciation to the search word "demo site" and then replace "damage site" with "demo site". The correction function may provide an interface in which, when replacing a search word with another word, all the words in the search result may be replaced at a time, or only some words are selectively replaced depending on the user's section.

As such, according to the embodiments of the present disclosure, when looking up words in a text transcript of an audio recording of speech, words with a similar pronunciation may be searched as well, thereby improving the performance of word search in the audio recording. Also, according to the embodiments of the present disclosure, it is possible to provide a function for filtering words contained in a pronunciation-based search result according to search accuracy and a function for correcting a word contained in the pronunciation-based search result and replacing it with another word, thereby improving the user's convenience of using the service.

The aforementioned system may be implemented in the form of a hardware component, a software component, and/or a combination of a hardware component and a software component. For example, the system and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. A processor may run an operating system (OS) and one or more software applications executed on the OS. Furthermore, the processor may access, store, manipulate, process, and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction, or a combination of one or more of these and may configure a processor so that it operates as desired or may instruct the processor independently or collectively. The software and/or data may be embodied in a machine, component, physical device, virtual equipment, or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The medium may continuously store a computer readable program, or temporarily store the computer readable program for execution or downloading. Further, the medium may be a variety of recording means or storage means in the form of a single hardware or a combination of a plurality of hardware, but is not limited to a medium directly connected to any computer system, but may be distributed on a network. Examples of the medium include a magnetic medium such as a hard disk, a floppy disk and a magnetic tape, an optical recording medium such as CD-ROM and DVD, a magneto-optical medium such as a floptical disk, ROM, RAM, flash memory, and the like such that program instructions are configured to be stored. Other examples of the medium may include a recording medium or a storage medium that is managed by an application store that distributes applications or a site, a server, etc. that supply or distribute various other software.

As described above, although the embodiments have been described in connection with the limited embodiments and the drawings, those skilled in the art may modify and change the embodiments in various ways from the description. For example, the relevant results may be achieved even when the described technologies are performed in a different order than the described methods, and/or even when the described components such as systems, structures, devices, and circuits are coupled or combined in a different form than the described methods or are replaced or substituted by other components or equivalents.

Therefore, other implementations, other embodiments, and equivalents to the claims are also within the scope of the following claims.

The embodiments of the invention in which an exclusive property or privilege is claimed are defined as follows:

1. An audio recording management method executed by a computer device having at least one processor configured to execute computer-readable instructions contained in a memory, the method comprising the steps of:
   creating a text transcript of an audio recording by converting speech to text;
   matching and managing the text transcript and a memo generated during an utterance spoken at a specific time in recording of the audio recording by a user, wherein the memo is matched to audio of the audio recording corresponding to the specific time of the utterance spoken;
   providing the text transcript in connection with the memo; and
   searching in the text transcript for a word with a similar pronunciation as a search word and whose similarity to the search word is a certain percent or more by comparing the word and the search word depending on what type of smaller units the word and the search word are broken down into, wherein the type of smaller units is one of phonemes, stems, and terms.

2. The audio recording management method of claim 1, wherein the providing of the text transcript comprises displaying the text transcript and the memo together in a dual view on a screen.

3. The audio recording management method of claim 1, wherein the providing of the text transcript comprises matching and displaying the text transcript and the memo in terms of time based on a timestamp.

4. The audio recording management method of claim 1, wherein the providing of the text transcript comprises:
   displaying a timestamp for the text transcript of the utterance in the audio recording to indicate when the utterance occurs; and displaying a timestamp for the memo to indicate a text transcript time or audio playback time at the time of creation of the memo.

5. The audio recording management method of claim 1, wherein the providing of the text transcript comprises:
displaying a memo tag for the text of the utterance included in the text transcript depending on whether there is a memo written in the utterance; and
displaying the full memo written in the utterance of the text when the memo tag is selected.

6. The audio recording management method of claim 1, wherein the creating of the text transcript comprises receiving an audio file recorded from a client or an audio file uploaded from the client and converting speech data corresponding to the utterance into text.

7. The audio recording management method of claim 1, wherein the managing of the text transcript comprises matching and managing the memo generated during recording of the audio based on a timestamp of the audio recording.

8. The audio recording management method of claim 1, wherein the creating of the text transcript comprises:
connecting an artificial intelligent device providing an audio-based interface to a user account; and
creating a text transcript by converting a speech received from the artificial intelligent device into text.

9. The audio recording management method of claim 8, wherein the connecting of the artificial intelligent device comprises:
issuing a connect key in response to a request from the artificial intelligent device; and
connecting the user account and the artificial intelligent device upon receiving the connect key through the user account.

10. The audio recording management method of claim 8, wherein the providing of the text transcript comprises sharing the text transcript of the audio recording with at least one user specified through the user account.

11. The audio recording management method of claim 1, wherein the creating of the text transcript comprises performing speech recognition by assigning a weight to a custom keyword the user enters in relation to the speech.

12. The audio recording management method of claim 11, wherein the speech recognition is performed by applying boosting to the custom keyword.

13. The audio recording management method of claim 11, wherein the performing of the speech recognition comprises extracting the custom keyword from the memo.

14. The audio recording management method of claim 11, wherein the performing of the speech recognition comprises extracting, as the custom keyword, at least either a word entered by the user to give information on the text transcript or a keyword registered as a frequently used word.

15. The audio recording management method of claim 1, further comprising correcting at least one word contained in a search result for the text transcript and replacing the same with another word.

16. A non-transitory computer-readable recording medium storing a program for executing the audio recording management method of claim 1.

17. A computer device comprising at least one processor configured to execute computer-readable instructions stored in a memory, the at least one processor comprising:
a text transcript creation part for creating a text transcript of an audio recording by converting speech to text;
a memo matching and management part for matching and managing the text transcript and a memo generated during an utterance spoken at a specific time in recording of the audio recording by a user, wherein the memo is matched to audio of the audio recording corresponding to the specific time of the utterance spoken; and
a text transcript provision part for:
providing the text transcript in connection with the memo; and
searching in the transcript for a word with a similar pronunciation as the search word and whose similarity to the search word is a certain percent or more by comparing the word and the search word depending on what type of smaller units the word and the search word are broken down into, wherein the type of smaller units is one of phonemes, stems, and terms.

* * * * *